US012719213B2

(12) United States Patent
Kimura

(10) Patent No.: US 12,719,213 B2
(45) Date of Patent: Aug. 25, 2026

(54) CONNECTOR ASSEMBLY

(71) Applicant: Japan Aviation Electronics Industry, Limited, Tokyo (JP)

(72) Inventor: Akira Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 467 days.

(21) Appl. No.: 18/500,488

(22) Filed: Nov. 2, 2023

(65) Prior Publication Data

US 2024/0258743 A1 Aug. 1, 2024

(30) Foreign Application Priority Data

Jan. 26, 2023 (JP) ................................ 2023-010348

(51) Int. Cl.
*H01R 13/629* (2006.01)
*H01R 13/11* (2006.01)

(52) U.S. Cl.
CPC ..... *H01R 13/62938* (2013.01); *H01R 13/113* (2013.01)

(58) Field of Classification Search
CPC ........... H01R 13/62938; H01R 13/113; H01R 4/5008; H01R 13/193; H01R 13/639; H01R 13/5202; H01R 13/521; H01R 13/53; H01R 13/701; H01R 13/7031
See application file for complete search history.

(56) References Cited

U.S. PATENT DOCUMENTS 8,882,521 B2 * 11/2014 Conway ............. H01R 13/5213 439/157
10,559,919 B2 * 2/2020 Masuda ........... H01R 13/62955
11,025,005 B1 * 6/2021 Shimizu ............. H01R 13/5202

FOREIGN PATENT DOCUMENTS

JP 2018152265 A 9/2018

* cited by examiner

*Primary Examiner* — Edwin A. Leon
(74) *Attorney, Agent, or Firm* — MUNCY, GEISSLER, OLDS & LOWE, P.C.

(57) ABSTRACT

The connector assembly includes a first connector having a first insulator and a first contact, a second connector having a second insulator and a second contact and being fitted to the first connector along a fitting direction, a contact spring member attached to the second contact and pressing the first contact against the second contact, a lever member held by the second insulator and being rotatable about a rotational axis between a first rotational position and a second rotational position, a rotational shaft member held by the second insulator to rotate about the rotational axis with rotation of the lever member and having a cam surface configured to elastically deform the contact spring member, and a fitting cam mechanism moving the first insulator and the second insulator relatively along the fitting direction in conjunction with rotation of the lever member.

18 Claims, 23 Drawing Sheets

CONNECTOR ASSEMBLY

BACKGROUND OF THE INVENTION

The present invention relates to a connector assembly, particularly to a connector assembly in which a fitting operation between a first connector and a second connector is performed by rotating a lever member.

Conventionally, there has been known a connector assembly using rotation of a lever member to easily perform a fitting operation between a pair of connectors. For instance, JP 2018-152265 A discloses a connector assembly comprising a first connector 1 and a second connector 2 to be fitted to the first connector 1 along a fitting direction D1, as shown in FIG. 44. A first housing 1A of the first connector 1 is provided with a protrusion 1B protruding in a direction perpendicular to the fitting direction D, and a lever member 3 is rotatably attached to the outside of a second housing 2A of the second connector 2 with a rotation fulcrum portion 2B as a fulcrum.

In the lever member 3, a guide groove (not shown) is formed to face an outer lateral surface of the second housing 2A. The second connector 2 is brought close to the first connector 1 along the fitting direction D, the protrusion 1B of the first connector 1 is inserted into the guide groove of the lever member 3, and in this state, the lever member 3 is rotated, whereby the first connector 1 and the second connector 2 are fitted together.

Upon fitting between the first connector 1 and the second connector 2, first contacts 1C disposed inside the first housing 1A are electrically connected to second contacts 2D inserted in contact insertion ports 2C of the second connector 2 as shown in FIG. 45.

The second contacts 2D are connected to ends of electric wires 4, and for instance, when the first connector 1 is mounted on an electric device which is not shown, electric current can flow to the electric device through the electric wires 4.

In the case of flowing electric current to an electric device using the foregoing connector assembly, the electric wires 4 connected to the second contacts 2D need to have a larger thickness as electric current increases.

However, when, for instance, the electric device is disposed in an environment where the electric device receives an external force such as vibration, e.g., mounted on a vehicle, the external force would be transmitted via the thick electric wires 4 to the points of contact between the first contacts 1C and the second contacts 2D, resulting in poor contact.

An increase in a contact force between the first contact 1C and the second contact 2D could improve their contact reliability but would require a higher insertion force in fitting the second connector 2 to the first connector 1, and this may make it difficult to easily perform a fitting operation between the first connector 1 and the second connector 2 even with the use of rotation of the lever member 3. Moreover, an increase in a contact force may also cause damage on surfaces of the first contact 1C and the second contact 2D, thus leading to a lower contact reliability.

SUMMARY OF THE INVENTION

The present invention has been made to solve the foregoing conventional problems and aims at providing a connector assembly that can improve the contact reliability between a first contact and a second contact while a first connector and a second connector are easily fitted together.

A connector assembly according to the present invention comprises:

a first connector including a first insulator and a first contact held by the first insulator;

a second connector including a second insulator and a second contact held by the second insulator, the second connector being fitted to the first connector along a fitting direction;

a contact spring member attached to the second contact and including a pressing portion configured to press the first contact against the second contact to bring the first contact and the second contact into contact with each other;

a lever member held by the second insulator and being rotatable about a rotational axis between a first rotational position and a second rotational position;

a rotational shaft member held by the second insulator to rotate about the rotational axis along with rotation of the lever member and including a cam surface configured to elastically deform the contact spring member; and a fitting cam mechanism relatively moving the first insulator and the second insulator along the fitting direction in conjunction with rotation of the lever member, wherein when the lever member is placed in the second rotational position, the cam surface of the rotational shaft member makes contact with and elastically deforms the contact spring member, whereby a first contact insertion portion that allows the first contact to be inserted thereinto along the fitting direction is formed between the pressing portion and the second contact, and in a state where the first connector and the second connector are fitted together and the first contact is inserted in the first contact insertion portion, when the lever member is rotated from the second rotational position to the first rotational position, fitting between the first connector and the second connector is locked by the fitting cam mechanism, and the cam surface of the rotational shaft member is moved away from the contact spring member, so that the first contact and the second contact are pressed against each other by the pressing portion to make contact with each other.

DETAILED DESCRIPTION OF THE INVENTION

Embodiments of the present invention are described below based on the accompanying drawings.

Embodiment 1

Figure 1:
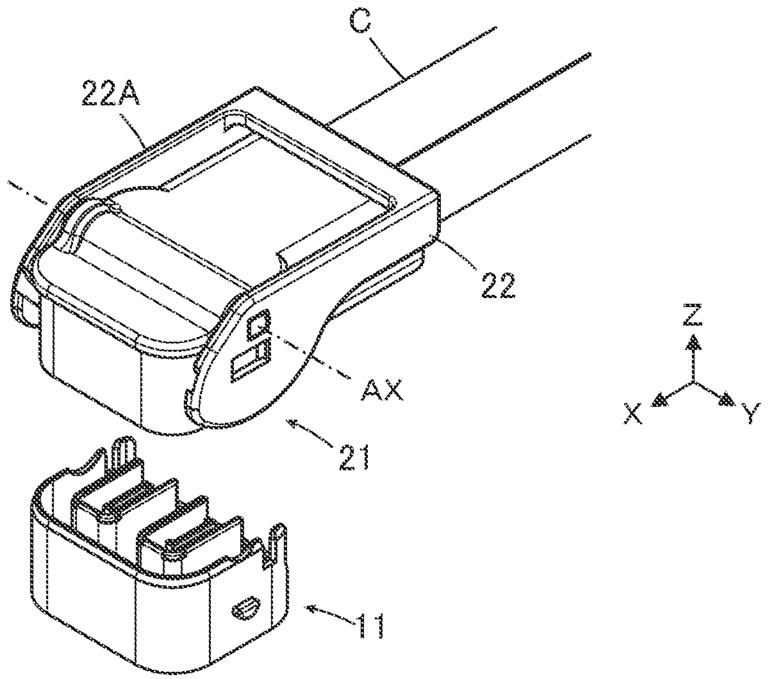
FIG. 1 is a perspective view showing a connector assembly according to Embodiment 1 before fitting operation, with a lever member being situated in a first rotational position.

FIG. 1 shows a connector assembly according to Embodiment 1 before fitting operation. The connector assembly includes a first connector 11 and a second connector 21 that is fitted to the first connector 11 along a fitting direction. For instance, when the first connector 11 is mounted on an electrical device (not shown) and the second connector 21 is attached to ends of two electric wires C, the connector assembly can detachably connect the two electric wires C to the electrical device.

Fitting and detachment between the first connector 11 and the second connector 21 are carried out by rotating a lever member 22 included in the second connector 21 about a rotational axis AX.

For convenience, the direction of fitting between the first connector 11 and the second connector 21 is referred to as "Z direction," the direction in which the rotational axis AX of the lever member 22 extends as "Y direction," and the direction orthogonal to the Z direction and the Y direction as "X direction."

The second connector 21 is moved from the +Z direction to the −Z direction to be fitted to the first connector 11.

Figure 2:
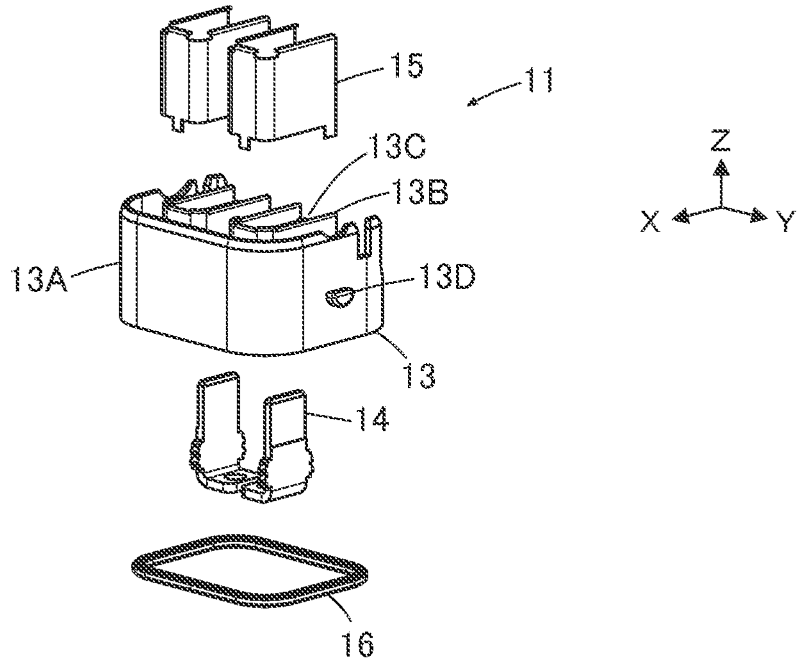
FIG. 2 is an exploded perspective view of a first connector used in Embodiment 1.

FIG. 2 shows an exploded perspective view of the first connector 11. The first connector 11 includes a first insulator 13, a pair of first contacts 14 held by the first insulator 13, a pair of metal shells 15 corresponding to the pair of first contacts 14, and a waterproof packing 16 for device mounting use.

The first insulator 13 includes: a frame-like outer wall portion 13A made of an insulating resin material, having a U-shape opening toward the −X direction when viewed from the Z direction, and extending in the Z direction; and a pair of projecting portions 13B arranged side by side in the Y direction inside the outer wall portion 13A. The pair of projecting portions 13B each have a U-shape opening toward the −X direction when viewed from the Z direction and extend in the Z direction. The interior of the projecting portion 13B forms a second contact accommodating portion 13C in a recess shape opening toward the +Z direction and extending in the Z direction.

A pair of pins 13D are formed separately on the +Y directional outer surface and the −Y directional outer surface of the outer wall portion 13A to protrude in the Y direction.

Figure 3:
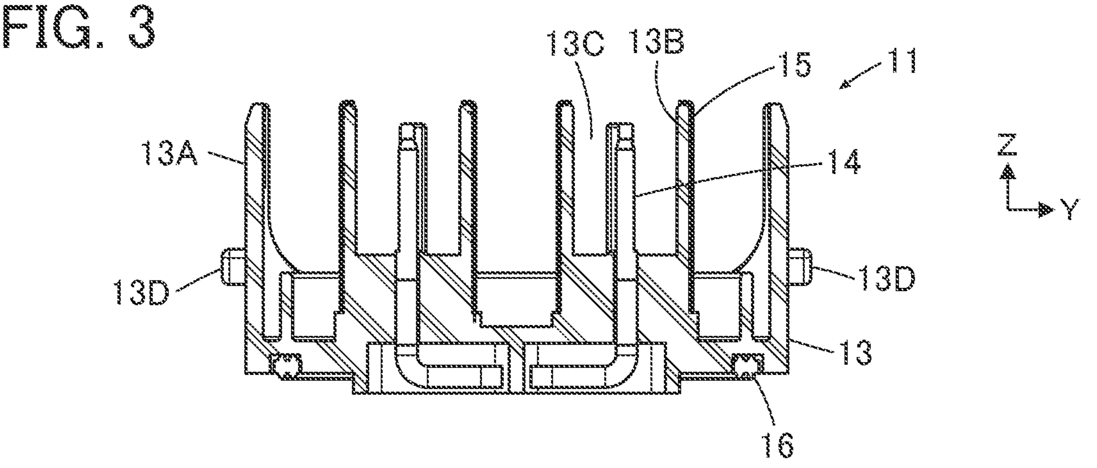
FIG. 3 is a cross-sectional view showing the first connector used in Embodiment 1.

The pair of first contacts 14 are made of a metal material having conductivity, and as shown in FIG. 3, held by the first insulator 13 by press-fitting or other methods. Each first contact 14 projects within the corresponding second contact accommodating portion 13C of the first insulator 13 and extends in the +Z direction. Lateral surfaces of the pair of projecting portions 13B are covered with the corresponding metal shells 15.

The pair of pins 13D formed to protrude from the outer wall portion 13A of the first insulator 13 are arranged on the same straight line extending along the Y direction.

The waterproof packing 16 for device mounting use is made of an elastic material such as rubber and disposed on the bottom surface of the first insulator 13 facing the −Z direction.

Figure 4:
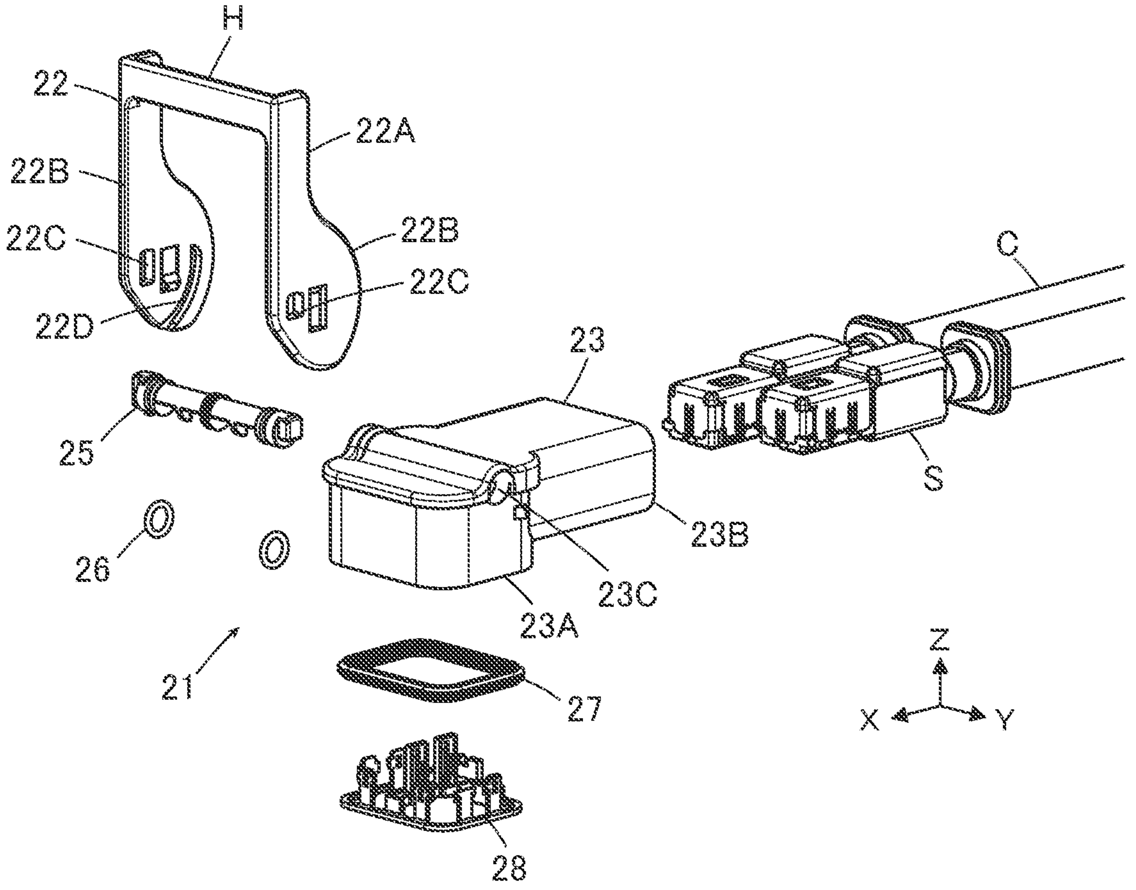
FIG. 4 is an exploded perspective view of a second connector used in Embodiment 1.

FIG. 4 shows an exploded perspective view of the second connector 21. The second connector 21 includes a second insulator 23, a pair of second contact structures S connected to ends of two electric wires C, a rotational shaft member 25 penetrating the second insulator 23 in the Y direction and rotatably attached to the second insulator 23, and the lever member 22 fixed to the opposite ends, in the Y direction, of the rotational shaft member 25.

The second insulator 23 includes a fitting portion 23A of tubular shape made of an insulating resin material and extending in the Z direction and an electric wire connection portion 23B of tubular shape joined to the −X directional side of the fitting portion 23A and extending in the X direction. The fitting portion 23A opens toward the −Z direction and is accommodated in the first connector 11 when the first connector 11 and the second connector 21 are fitted together. The electric wire connection portion 23B opens toward the −X direction and accommodates the pair of second contact structures S connected to the ends of the two electric wires C.

A pair of through holes 23C through which the rotational shaft member 25 extending in the Y direction penetrates are formed in the opposite lateral portions, in the Y direction, of the second insulator 23 at the +Z directional end of the fitting portion 23A. While FIG. 4 shows only the through hole 23C formed in the +Y directional lateral portion of the second insulator 23, a like through hole 23C is formed also in the −Y directional lateral portion of the second insulator 23. Those two through holes 23C are arranged on the same straight line extending along the Y direction.

The lever member 22 includes a handle portion 22A bent in a U-shape and a pair of flat plate portions 22B joined separately to the opposite ends of the handle portion 22A to face each other in the Y direction and each extending along an XZ plane. A grip portion H extending in the Y direction is formed at the distal end of the handle portion 22A, and a pair of fitting holes 22C are formed in the pair of flat plate portions 22B. The opposite ends of the rotational shaft member 25 penetrating the pair of through holes 23C of the second insulator 23 are jointed separately to the pair of fitting holes 22C, whereby the lever member 22 is held in a rotatable manner with respect to the second insulator 23.

Cam grooves 22D are separately formed at inner surfaces, facing each other, of the pair of flat plate portions 22B. While FIG. 4 shows only the cam groove 22D formed in the flat plate portion 22B on the −Y direction side, a like cam groove 22D is formed also in the flat plate portion 22B on the +Y direction side.

The pair of pins 13D of the first insulator 13 are separately inserted into the cam grooves 22D of the pair of flat plate portions 22B, and the cam grooves 22D and the pins 13D constitute a fitting cam mechanism that relatively moves the first insulator 13 and the second insulator 23 along the Z direction in conjunction with rotation of the lever member 22.

The second connector 21 further includes a pair of rotational shaft waterproof packings 26 disposed at the opposite ends of the rotational shaft member 25, a fitting portion waterproof packing 27 disposed at the −Z directional end of the second insulator 23, and a packing holding member 28 preventing the fitting portion waterproof packing 27 from coming off the second insulator 23. The rotational shaft waterproof packings 26 each surround the corresponding end of the rotational shaft member 25 along an XZ plane and seal between an inner surface of the corresponding through hole 23C of the second insulator 23 and an outer peripheral surface of the corresponding end of the rotational shaft member 25, and the fitting portion waterproof packing 27 seals between the first insulator 13 and the second insulator 23 when the first connector 11 and the second connector 21 are fitted together.

Figure 5:
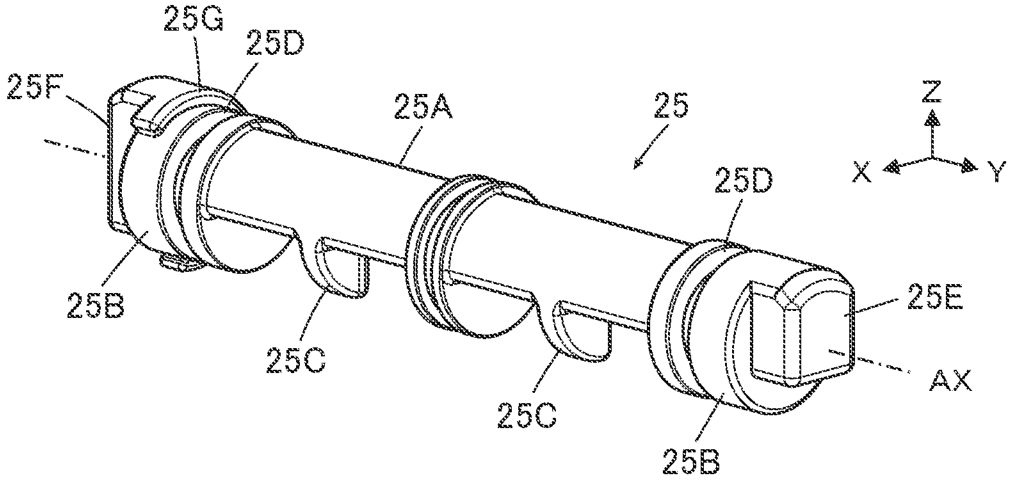
FIG. 5 is a perspective view showing a rotational shaft member used in Embodiment 1.

As shown in FIG. 5, the rotational shaft member 25 includes a shaft body 25A extending in the Y direction along the rotational axis AX, and the shaft body 25A is provided at its opposite ends separately with a pair of round columnar portions 25B that take the rotational axis AX as their center and have the same diameter. Protruding plates 25C are disposed at a distance in the Y direction between the pair of round columnar portions 25B to protrude in the radial direction from the shaft body 25A. The shaft body 25A and the protruding plates 25C have a common outer peripheral surface of cylindrical shape taking the rotational axis AX as their center.

The pair of round columnar portions 25B are separately provided with packing retaining grooves 25D of annular shape formed along an XZ plane in outer peripheral portions of the round columnar portions 25B. The pair of rotational shaft waterproof packings 26 shown in FIG. 4 are fitted in those packing retaining grooves 25D and thereby retained in the rotational shaft member 25.

Of the pair of round columnar portions 25B, the round columnar portion 25B disposed on the +Y direction side is provided at its +Y directional end surface with a protrusion 25E protruding in the +Y direction, and the round columnar portion 25B disposed on the −Y direction side is provided at its −Y directional end surface with a protrusion 25F protruding in the −Y direction and having a different shape from that of the protrusion 25E on the +Y direction side, in other words, extending longer in the Z direction than the protrusion 25E.

Further, a large diameter portion 25G having a larger diameter than the round columnar portion 25B is formed between the packing retaining groove 25D and the protrusion 25F to be adjacent to the round columnar portion 25B disposed on the −Y direction side.

Figure 6:
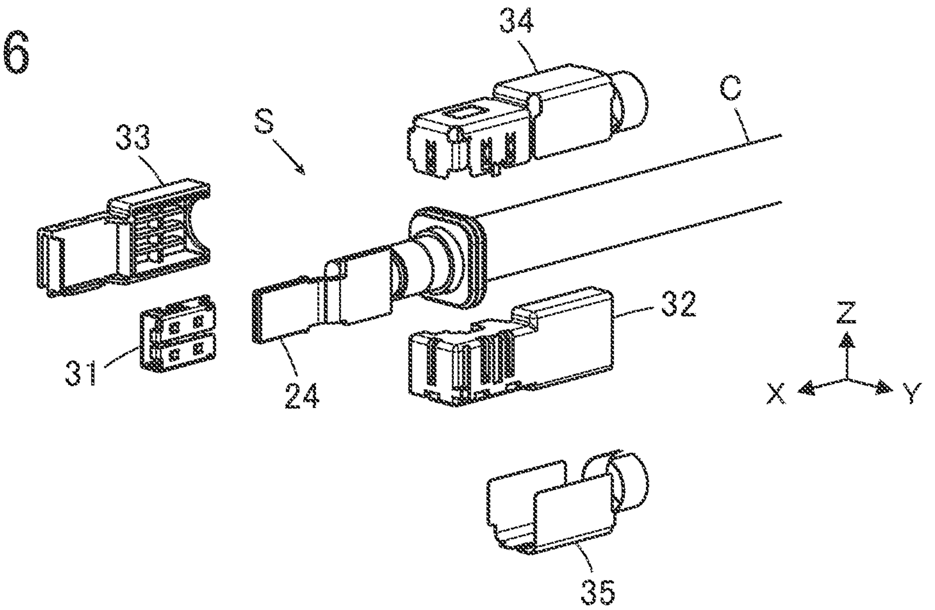
FIG. 6 is an exploded perspective view of a second contact structure in Embodiment 1.

FIG. 6 shows an exploded perspective view of, of the pair of second contact structures S, the second contact structure S disposed on the +Y direction side. The second contact structure S includes: a second contact 24 connected to the +X directional end of the electric wire C and made of a metal material having conductivity; and a frame member 31 attached to the second contact 24.

The second contact structure S further includes: a pair of inner insulators 32 and 33 that accommodate the second contact 24 to which the frame member 31 is attached, by sandwiching the second contact 24 from the +Y direction and the −Y direction; and a pair of shells 34 and 35 that surround the inner insulators 32 and 33 to sandwich the inner insulators 32 and 33 from the +Z direction and the −Z direction.

Figure 7:
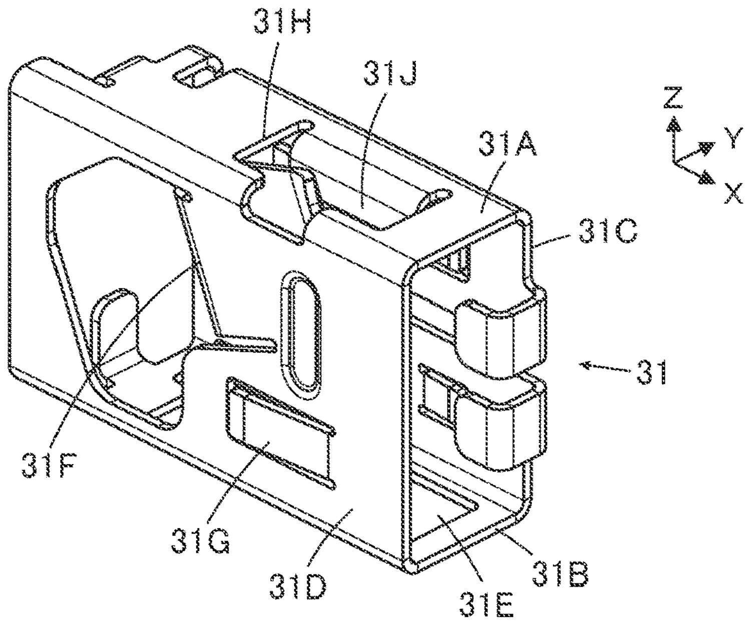
FIG. 7 is a perspective view showing a frame member used in Embodiment 1.

As shown in FIG. 7, the frame member 31 is formed from a tubular metal plate having a substantially rectangular shape in YZ cross section and extending in the X direction, and includes a top surface portion 31A extending along an XY plane and situated on the +Z direction side, a bottom surface portion 31B extending along an XY plane and situated on the −Z direction side, a lateral surface portion 31C extending along an XZ plane and joining the +Y directional ends of the top surface portion 31A and the bottom surface portion 31B together, and a lateral surface portion 31D extending along an XZ plane and joining the −Y directional ends of the top surface portion 31A and the bottom surface portion 31B together.

The second contact 24 is disposed along the inner surface of the lateral surface portion 31C, and the corresponding first contact 14 of the first connector 11 is inserted to the interior of the frame member 31 through a first contact insertion port 31E formed in the bottom surface portion 31B in fitting between the first connector 11 and the second connector 21.

The frame member 31 is provided in its interior with a contact spring member 31F formed from a plate spring made by cutting a metal plate constituting the lateral surface portion 31D into a substantially U-shape and bending the cut portion toward the interior of the frame member 31. The contact spring member 31F is configured to press the first contact 14, which has been inserted to the interior of the frame member 31 through the first contact insertion port 31E, against the second contact 24 disposed along the inner surface of the lateral surface portion 31C to bring the first contact 14 and the second contact 24 into contact with each other when the first connector 11 and the second connector 21 are fitted together. By elastic deformation of the contact spring member 31F, a first contact insertion portion constituted of a space extending in the +Z direction from the first contact insertion port 31E is formed in the interior of the frame member 31.

The frame member 31 further includes a frame moving spring member 31G formed from a plate spring made by cutting the metal plate constituting the lateral surface portion 31D into a U-shape and bending the cut portion toward the outside of the frame member 31, that is, bending the cut portion in the −Y direction from the lateral surface portion 31D. The frame moving spring member 31G is configured to move the frame member 31 in the Y direction by elastically contacting the inner surface of the inner insulator 33 in the second contact structure S in fitting between the first connector 11 and the second connector 21. The frame moving spring member 31G has an elastic force weaker than that of the contact spring member 31F.

The top surface portion 31A of the frame member 31 is provided with a protruding plate insertion port 31H used to insert the protruding plate 25C of the rotational shaft member 25 to the interior of the frame member 31 in fitting between the first connector 11 and the second connector 21. The protruding plate insertion port 31H is made by cutting a metal plate constituting the top surface portion 31A into a U-shape and bending the cut portion toward the interior of the frame member 31, and the bent portion of the metal plate forms a protruding plate receiving portion 31J extending along an XZ plane inside the protruding plate insertion port 31H.

Figure 8:
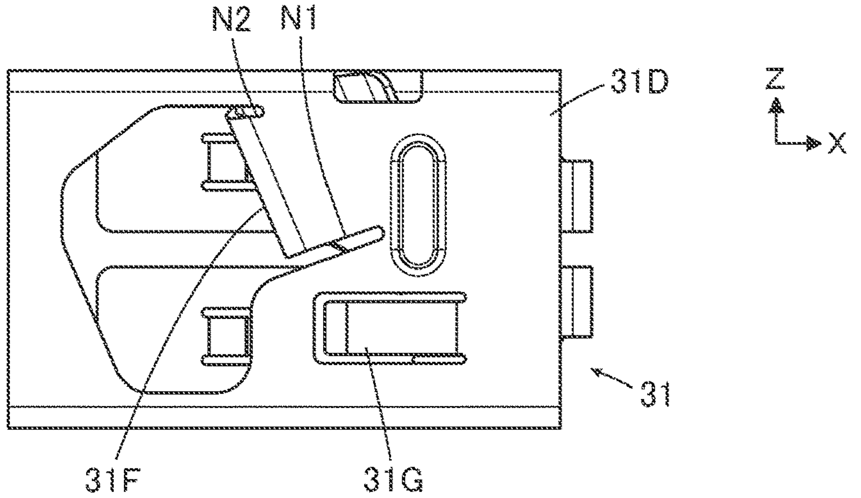
FIG. 8 is a side view showing the frame member used in Embodiment 1.

As shown in FIG. 8, the contact spring member 31F is formed to be inclined with respect to the X direction and has a pair of cuts N1 and N2 formed at the opposite ends of the contact spring member 31F in the width direction thereof in the metal plate constituting the lateral surface portion 31D. The cut N1 on the −Z direction side is longer than the cut N2 on the +Z direction side, and this configuration allows the contact spring member 31F to have an elastic force gradually increasing toward the +Z direction. In other words, as shown in FIG. 7, the contact spring member 31F has an elastic force that gradually increases from the first contact insertion port 31E, which is an opening end of the first contact insertion portion formed inside the frame member 31, toward an inner part of the first contact insertion portion in the +Z direction.

Figure 9:
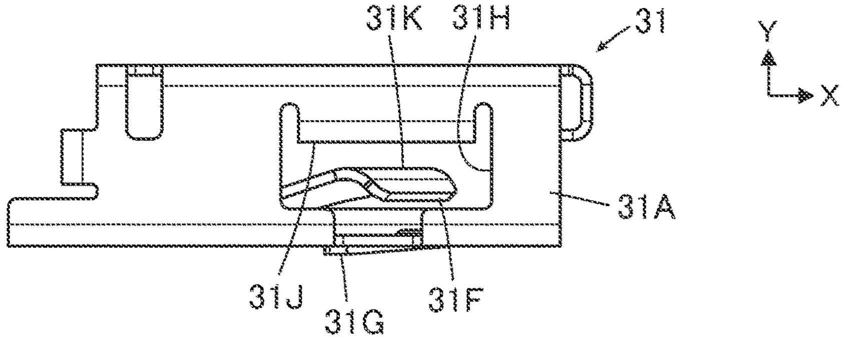
FIG. 9 is a plan view showing the frame member used in Embodiment 1.
Figure 10:
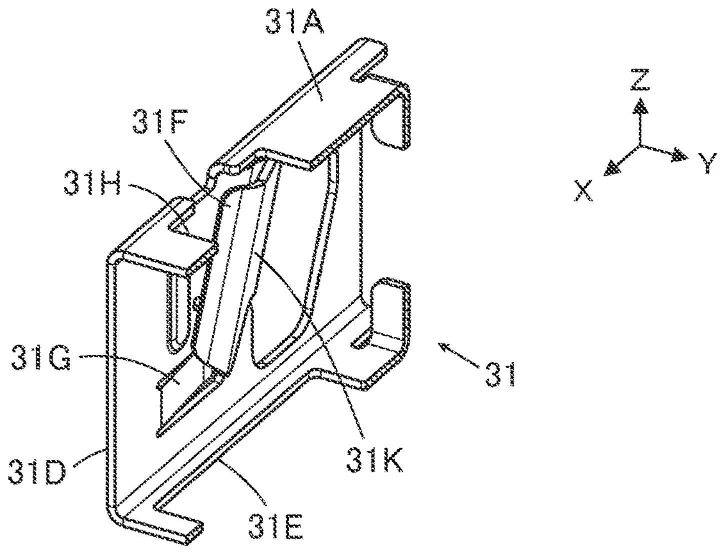
FIG. 10 is a cross-sectional perspective view showing the frame member used in Embodiment 1.

Since the contact spring member 31F is inclined with respect to the X direction, a pressing portion 31K inclined with respect to the Z direction and linearly extending along an XZ plane is formed on the contact spring member 31F as shown in FIGS. 9 and 10.

Figure 11:
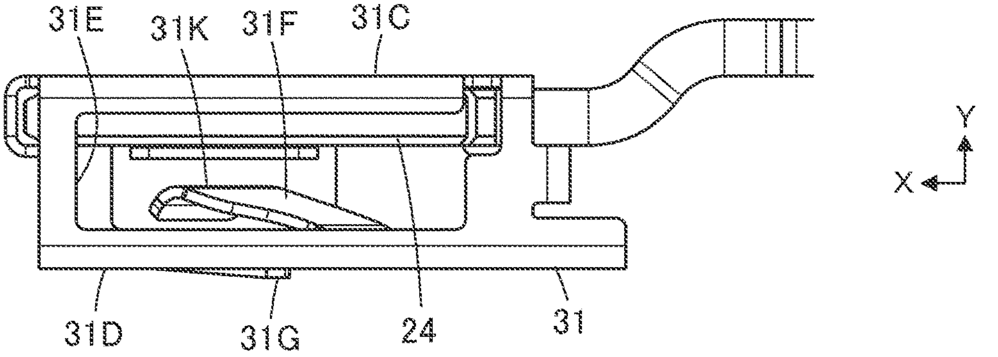
FIG. 11 is a bottom view showing the frame member joined with a second contact in Embodiment 1.

When the second contact 24 is disposed along the inner surface of the lateral surface portion 31C of the frame member 31, the pressing portion 31K of the contact spring member 31F faces the second contact 24 as shown in FIG. 11.

The frame moving spring member 31G formed in the frame member 31 projects in the −Y direction from the lateral surface portion 31D when receiving no external force.

It should be noted that, of the pair of second contact structures S, the second contact structure S disposed on the −Y direction side has a similar configuration as the second contact structure S disposed on the +Y direction side. The second contact structure S disposed on the −Y direction side is configured to be symmetrical in the Y direction to the second contact structure S disposed on the +Y direction side.

Figure 12:
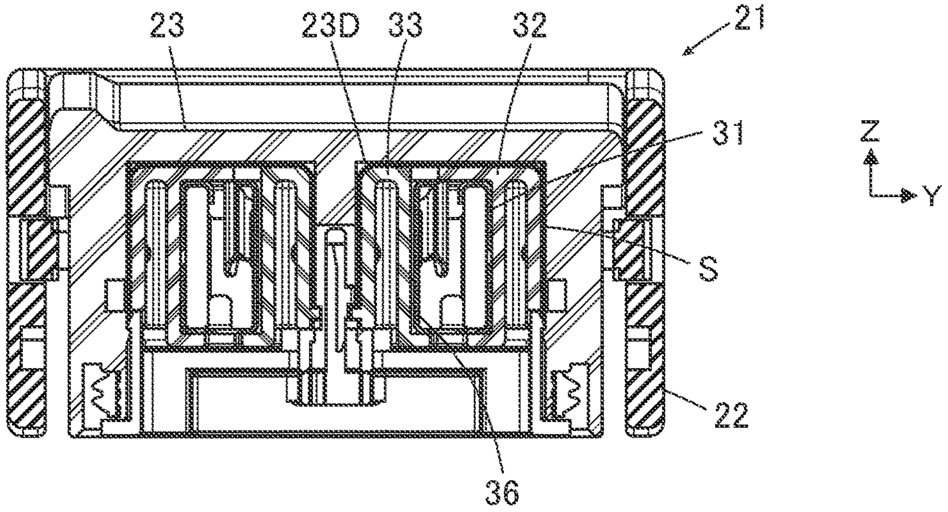
FIG. 12 is a cross-sectional view showing the second connector used in Embodiment 1.

As shown in FIG. 12, the pair of second contact structures S are fixed in a pair of structure accommodating portions 23D formed side by side in the Y direction in the second insulator 23. A frame member accommodating portion 36 is formed between the inner insulators 32 and 33 of each second contact structure S, and the frame member 31 is accommodated in the frame member accommodating portion 36. The dimension of the frame member accommodating portion 36 in the Y direction is larger than the length of the frame member 31 in the Y direction by a predetermined length, and the frame member 31 is accommodated to be movable in the Y direction within the frame member accommodating portion 36.

Next, the fitting operation between the first connector 11 and the second connector 21 is described.

The rotational angle of the lever member 22 with the handle portion 22A extending in the X direction as shown in FIG. 1 is defined as "zero degrees," and the rotational position of the lever member 22 in this state is defined as "first rotational position." The lever member 22 is rotatably attached to the second connector 21 such that the rotational angle can be changed from 0 degrees to 90 degrees.

Figure 13:
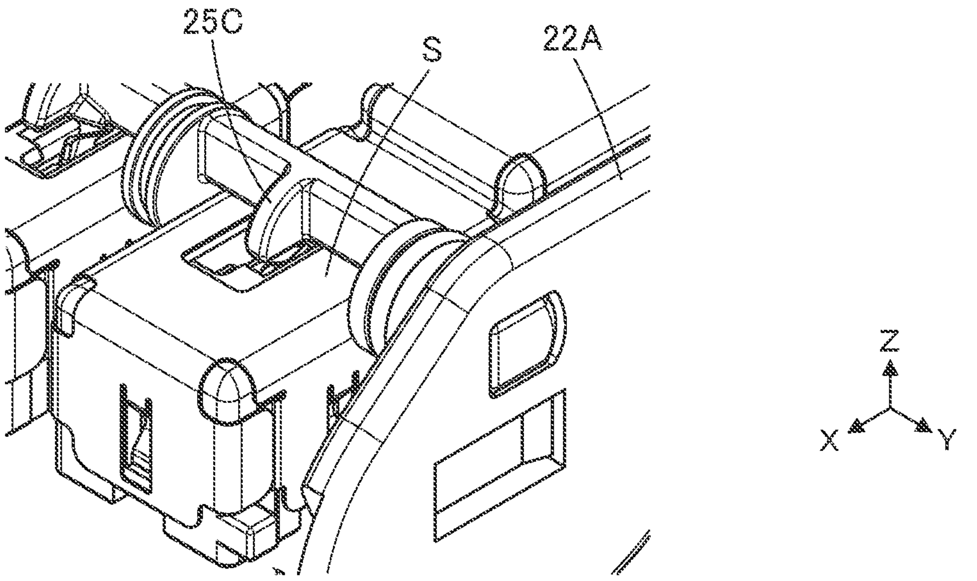
FIG. 13 is a partial perspective view showing the rotational shaft member when the lever member is situated in the first rotational position in Embodiment 1.

When the lever member 22 is in the first rotational position, as shown in FIG. 13, the protruding plate 25C formed in the rotational shaft member 25 is situated on the +Z direction side of the second contact structure S and is not inserted in the interior of the second contact structure S.

Figure 14:
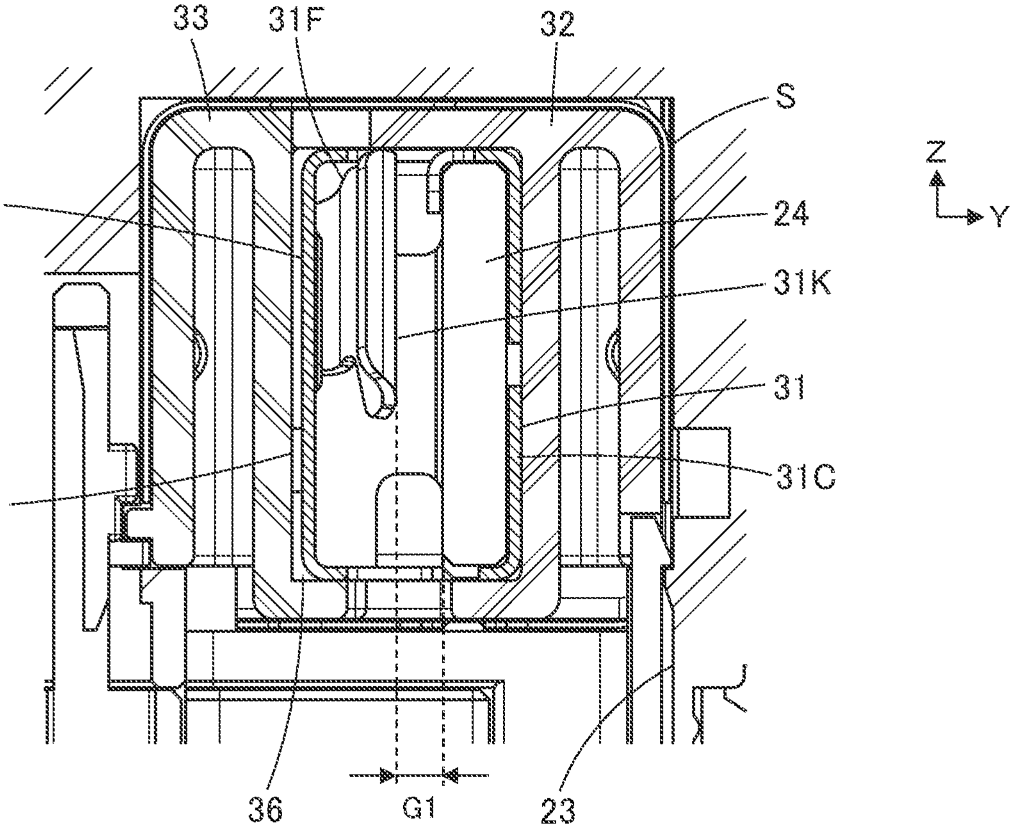
FIG. 14 is a cross-sectional front view showing an interior of the second connector before fitting operation, with the lever member being situated in the first rotational position in Embodiment 1.

At this time, no external force is exerted on the contact spring member 31F of the frame member 31 as shown in FIG. 14, and a gap G1 in the Y direction between the pressing portion 31K of the contact spring member 31F and the second contact 24 has a dimension smaller than the thickness of the first contact 14 which is not shown herein.

Figure 15:
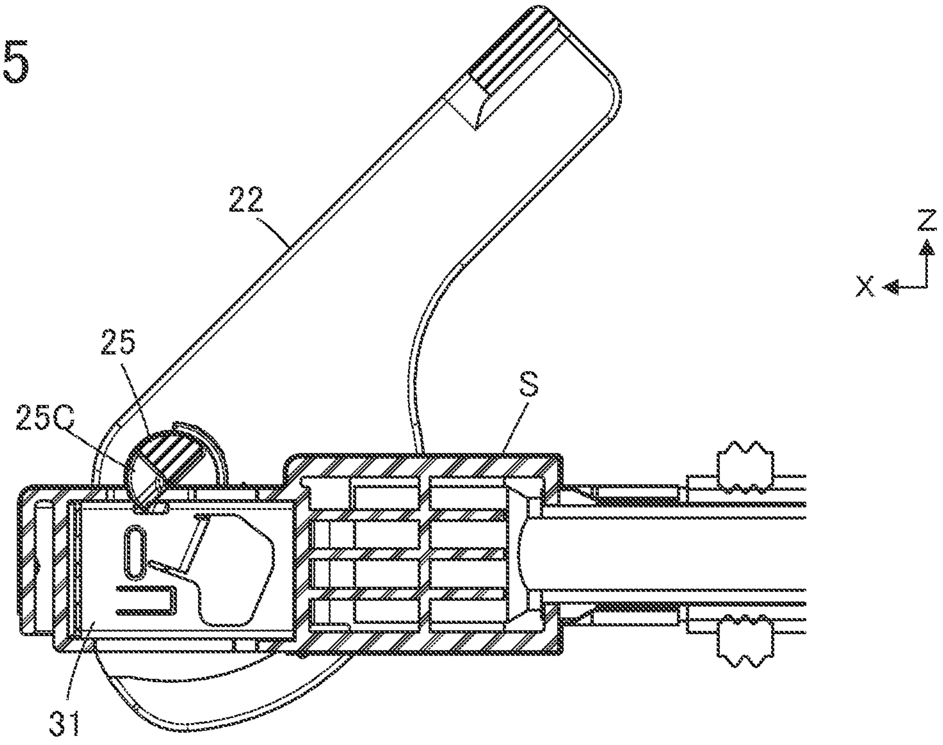
FIG. 15 is a cross-sectional side view showing a state of the rotational shaft member and the second contact structure in the process of rotation of the lever member from the first rotational position to a second rotational position in Embodiment 1.

From this state, as the rotational angle of the lever member 22 is increased from 0 degrees toward 90 degrees, the protruding plate 25C formed in the rotational shaft member 25 starts to be inserted into the frame member 31 through the protruding plate insertion port 31H formed in the frame member 31 of the second contact structure S as shown in FIG. 15.

The protruding plate 25C is provided with a cam surface 25H inclined in the Y direction along the rotational axis AX of the rotational shaft member 25, and this cam surface 25H makes contact with an end, in the width direction, of the pressing portion 31K of the contact spring member 31F of the frame member 31. Specifically, the cam surface 25H makes contact with the +Z directional end of the pressing portion 31K inclined with respect to the Z direction.

Figure 17:
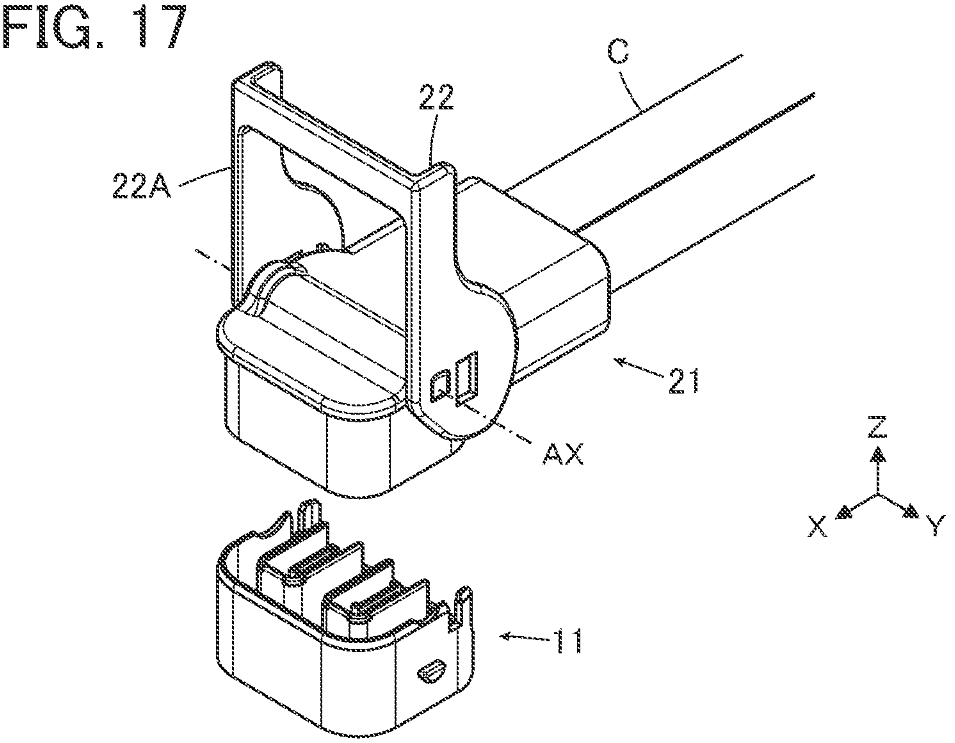
FIG. 17 is a perspective view showing the connector assembly according to Embodiment 1 before fitting operation, with the lever member being situated in the second rotational position.

The lever member 22 is further rotated up to the position where the handle portion 22A makes an angle of 90 degrees with respect to the X direction as shown in FIG. 17. The rotational position of the lever member 22 at this time is defined as "second rotational position."

Figure 18:
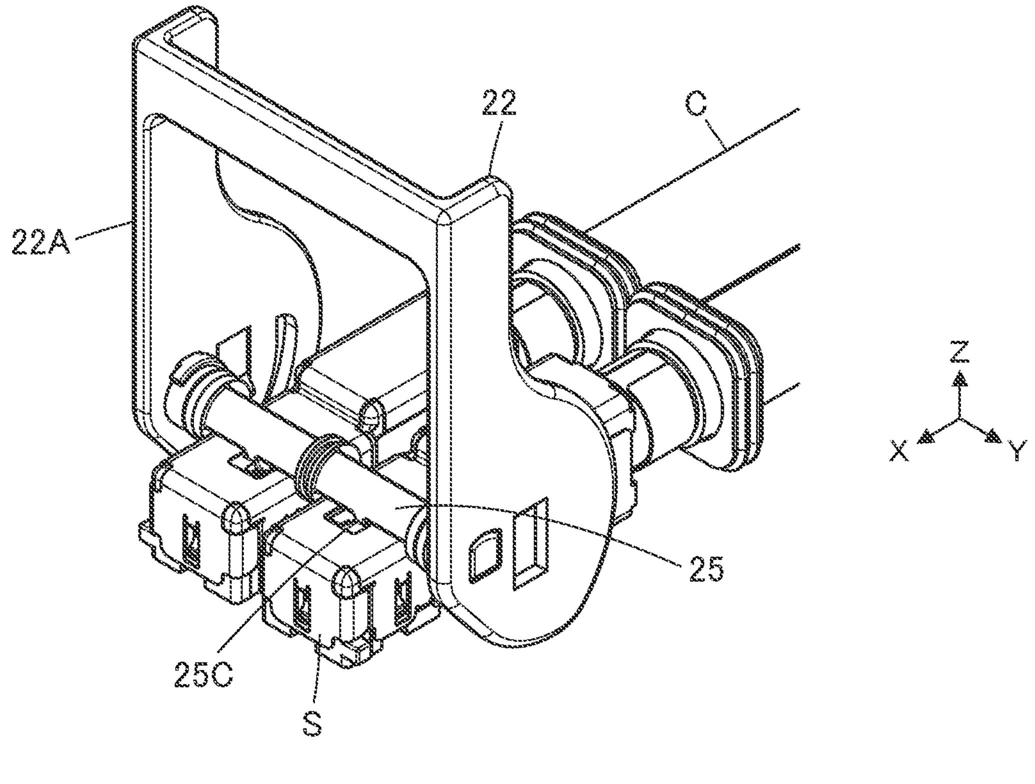
FIG. 18 is a perspective view showing the second connector from which a second insulator has been removed with the lever member being situated in the second rotational position in Embodiment 1.

When the lever member 22 is in the second rotational position, as shown in FIG. 18, the protruding plate 25C of the rotational shaft member 25 is inserted in the interior of the second contact structure S. It should be noted that FIG. 18 shows the interior of the second connector 21 with the second insulator 23 being omitted.

Figure 16:
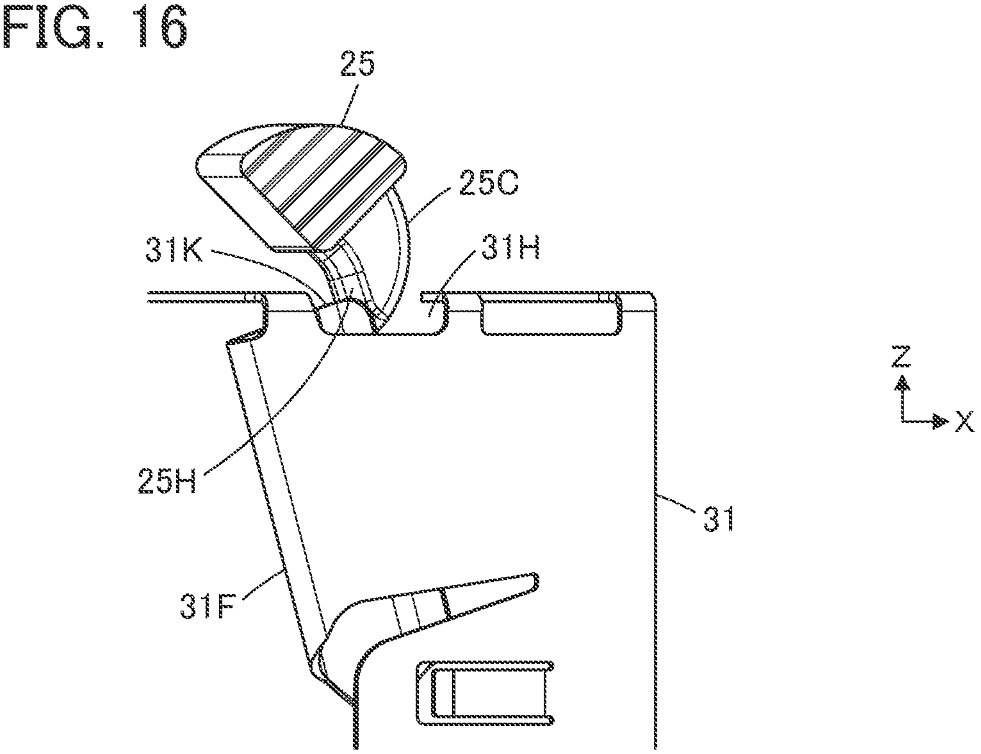
FIG. 16 is a partially broken perspective view showing a state of a cam surface of the rotational shaft member and the frame member of the second contact structure in the process of rotation of the lever member from the first rotational position to the second rotational position in Embodiment 1.
Figure 19:
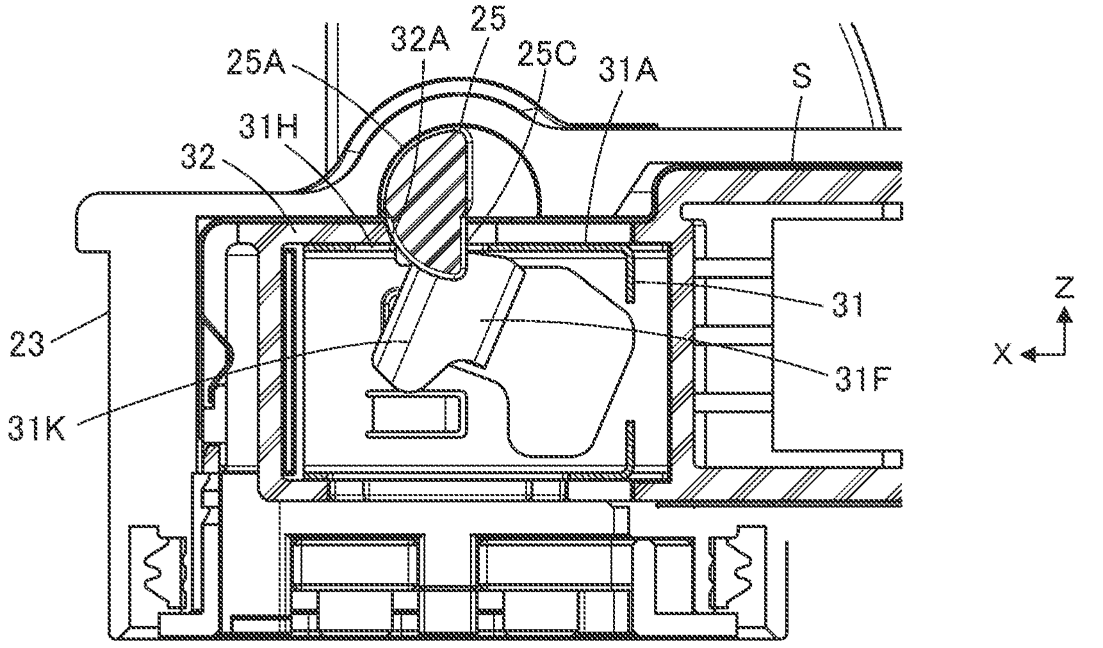
FIG. 19 is a cross-sectional side view showing a state of the rotational shaft member and the second contact structure before fitting operation, with the lever member being situated in the second rotational position in Embodiment 1.
Figure 20:
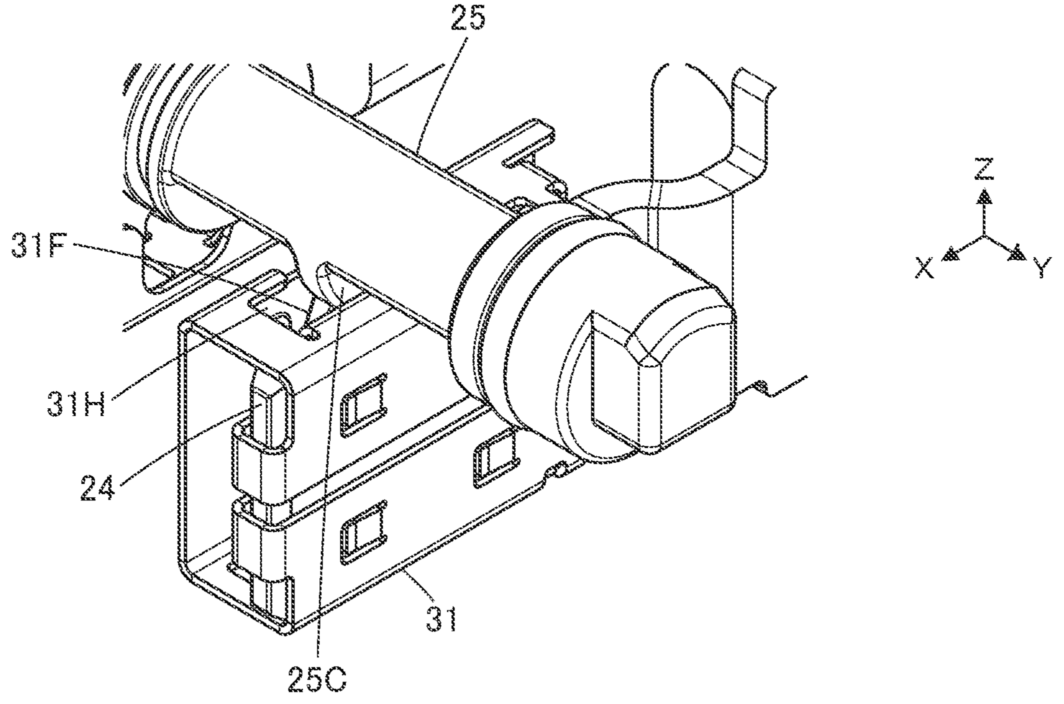
FIG. 20 is a partial perspective view showing the rotational shaft member when the lever member is situated in the second rotational position in Embodiment 1.

Since the protruding plate 25C is inserted to the interior of the second contact structure S with the cam surface 25H of the protruding plate 25C being in contact with the pressing portion 31K of the contact spring member 31F as shown in FIG. 16, the pressing portion 31K of the contact spring member 31F receives a force acting in the −Y direction from the protruding plate 25C that has been inserted in the interior of the frame member 31 through the protruding plate insertion port 31H of the frame member 31 as shown in FIGS. 19 and 20.

Figure 21:
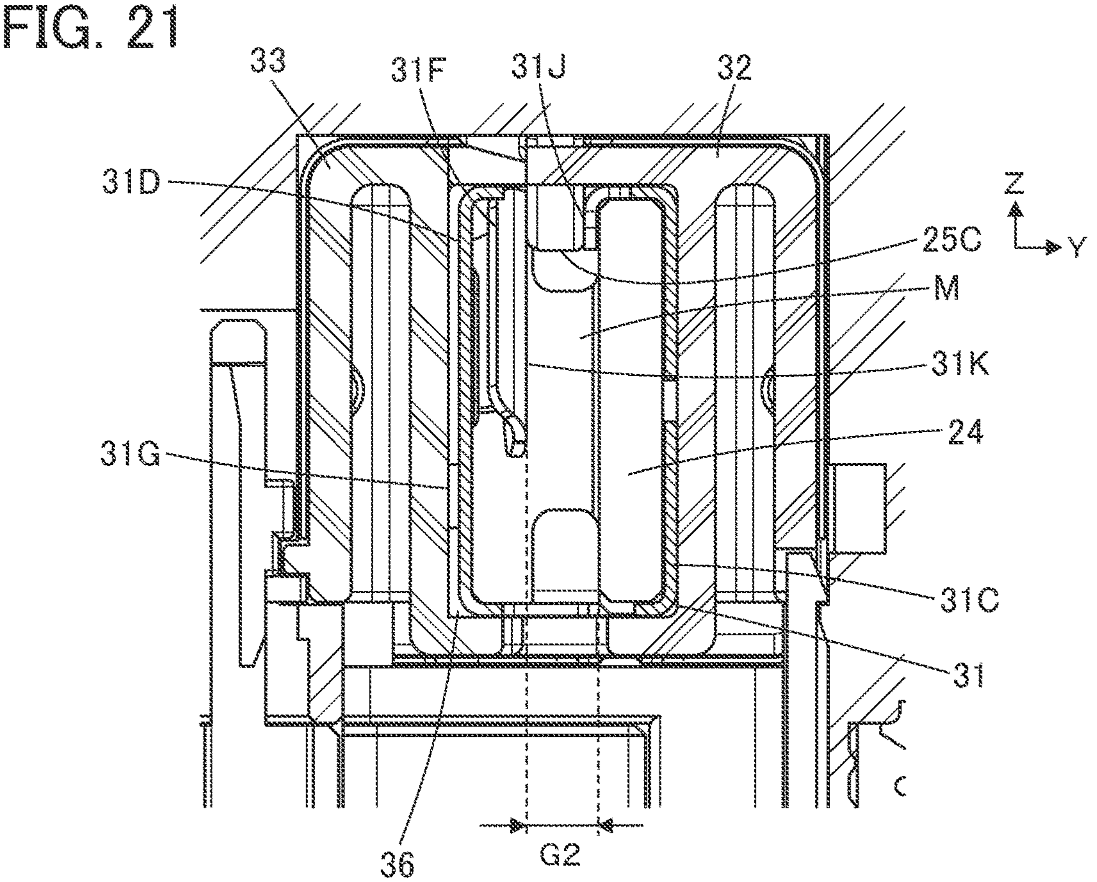
FIG. 21 is a cross-sectional front view showing an interior of the second connector before fitting operation, with the lever member being situated in the second rotational position in Embodiment 1.

Consequently, the contact spring member 31F is elastically deformed, and the pressing portion 31K of the contact spring member 31F is moved in the −Y direction away from the second contact 24 disposed along the inner surface of the lateral surface portion 31C of the frame member 31, as shown in FIG. 21. As a result, a gap G2 in the Y direction having a dimension larger than the thickness of the first contact 14 is formed between the pressing portion 31K and the second contact 24.

Thus, a first contact insertion portion M that allows the first contact 14 to be inserted along the Z direction without contacting the second contact 24 is formed between the pressing portion 31K of the contact spring member 31F and the second contact 24.

It should be noted that the protruding plate 25C elastically deforming the contact spring member 31F receives a force acting in the +Y direction, as a reaction, from the contact spring member 31F; however, since the protruding plate 25C makes contact with and is supported by the protruding plate receiving portion 31J of the frame member 31, the protruding plate 25C can elastically deform the contact spring member 31F without moving in the +Y direction.

The length from the rotational axis AX of the rotational shaft member 25 to the handle portion 22A of the lever member 22 is set larger than the length from the rotational axis AX to the protruding plate 25C. Owing to this configuration, the protruding plate 25C can be inserted into the frame member 31 to elastically deform the contact spring member 31F by rotating the lever member 22 with a small operational force by use of the handle portion 22A.

Furthermore, the contact spring member 31F is configured to have an elastic force gradually increasing toward the +Z direction, and the protruding plate 25C elastically deforms the contact spring member 31F upon contacting the +Z directional end of the contact spring member 31F, the +Z directional end having a larger elastic force. Accordingly, the contact spring member 31F can be elastically deformed sufficiently even with a small amount of movement of the protruding plate 25C in the Z direction, thus leading to a small size of the second connector 21.

As shown in FIG. 19, the inner insulator 32 of the second contact structure S is provided with a restriction surface 32A facing, from the +X direction, the common outer peripheral surface of cylindrical shape formed on the shaft body 25A and the protruding plate 25C of the rotational shaft member 25.

Therefore, even when a force acting in the −X direction is exerted on the second contact structure S via the contact spring member 31F of the frame member 31 when the protruding plate 25C elastically deforms the contact spring member 31F, the restriction surface 32A makes contact with the outer peripheral surface of the shaft body 25A and the protruding plate 25C of the rotational shaft member 25 and thereby prevents the second contact structure S and the electric wire C from being pulled off the second insulator 23 in the −X direction.

Figure 22:
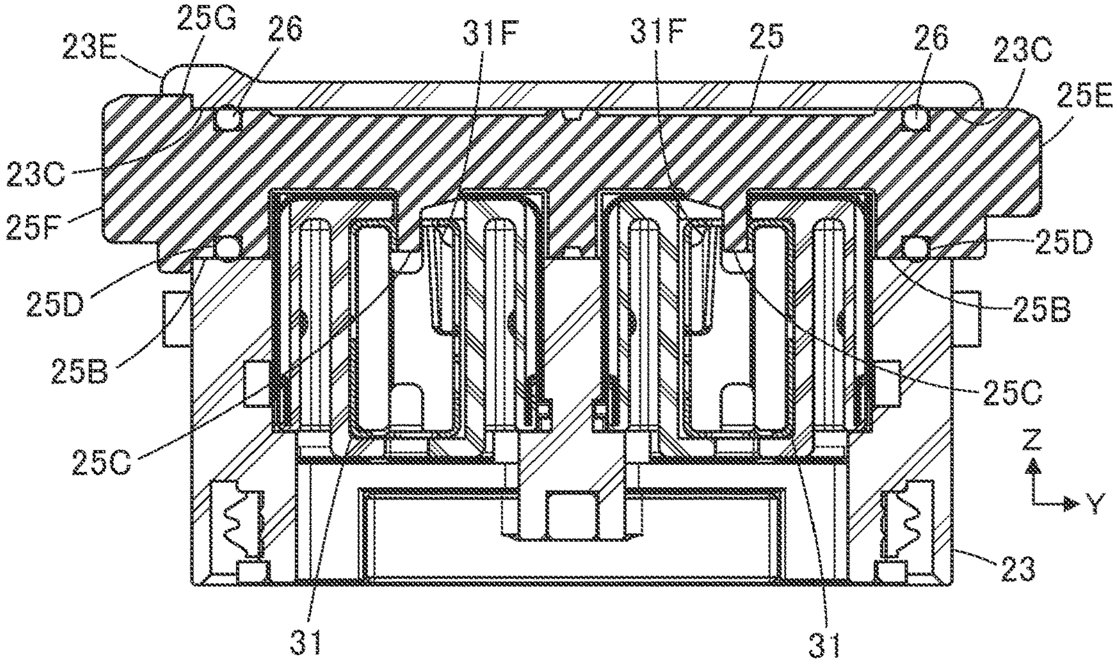
FIG. 22 is a cross-sectional front view showing the rotational shaft member before fitting operation, with the lever member being situated in the second rotational position in Embodiment 1.

As shown in FIG. 22, the rotational shaft member 25 penetrates the pair of through holes 23C of the second insulator 23 in the Y direction, and spaces between the inner surfaces of the pair of through holes 23C of the second insulator 23 and the pair of round columnar portions 25B of the rotational shaft member 25 are separately sealed due to the presence of the rotational shaft waterproof packings 26 retained in the pair of packing retaining grooves 25D of the rotational shaft member 25.

The large diameter portion 25G formed at the −Y directional end of the rotational shaft member 25 and having a larger diameter than the round columnar portion 25B is rotatably accommodated in a shaft end accommodating portion 23E adjacent to the through hole 23C of the second insulator 23 on the −Y direction side. No shaft end accommodating portion 23E is formed in the vicinity of the through hole 23C of the second insulator 23 on the +Y direction side. Accordingly, even when an attempt is made to insert the rotational shaft member 25 to the pair of through holes 23C of the second insulator 23 in a wrong orientation, the large diameter portion 25G of the rotational shaft member 25 interferes with the second insulator 23 to prevent the pair of round columnar portions 25B of the rotational shaft member 25 from being accommodated in the pair of through holes 23C of the second insulator 23.

Figure 23:
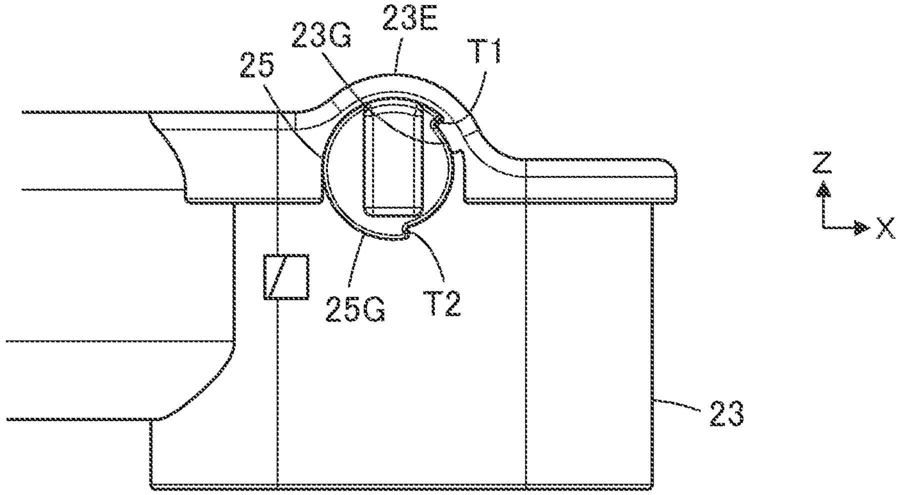
FIG. 23 is a side view showing an end of the rotational shaft member before fitting operation, with the lever member being situated in the second rotational position in Embodiment 1.

Besides, as shown in FIG. 23, the large diameter portion 25G of the rotational shaft member 25 projects in the −Y direction from the second insulator 23, and the large diameter portion 25G is provided with a first step portion T1 and a second step portion T2 in two places along the circumferential direction of the rotational shaft member 25, each of the step portions T1 and T2 having a step in the radial direction.

The shaft end accommodating portion 23E of the second insulator 23 is provided with a stopper 23G protruding toward the rotational shaft member 25.

The stopper 23G selectively makes contact with the first step portion T1 and the second step portion T2 in accordance with the rotation of the rotational shaft member 25. When the lever member 22 is situated in the second rotational position after being rotated up to the position where the handle portion 22A makes an angle of 90 degrees with respect to the X direction as shown in FIG. 17, the stopper 23G makes contact with the first step portion T1 to inhibit the lever member 22 from being rotated to the position where the handle portion 22A is inclined to the +X direction side over 90 degrees.

Figure 24:
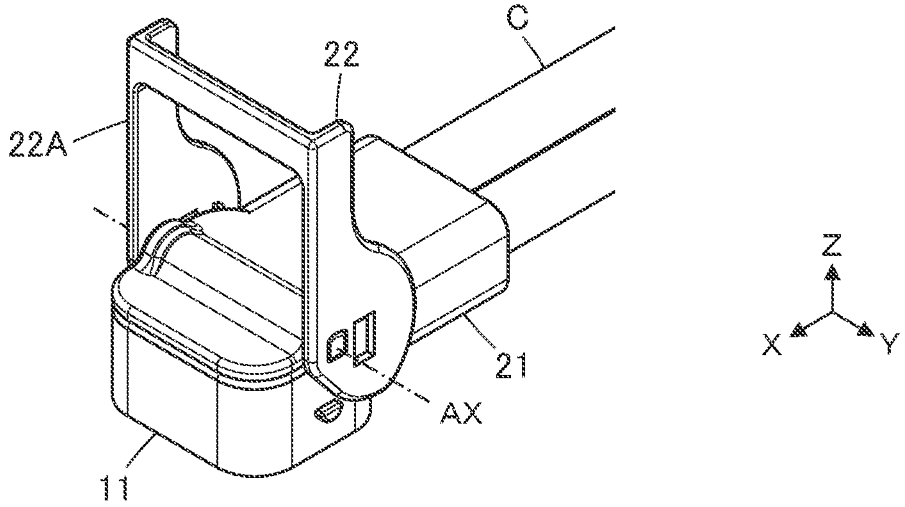
FIG. 24 is a perspective view showing the connector assembly according to Embodiment 1 after fitting, with the lever member being situated in the second rotational position.

With the lever member 22 being in the second rotational position, the second connector 21 is moved toward the first connector 11 in the −Z direction, whereby the second connector 21 is fitted to the first connector 11 as shown in FIG. 24.

Figure 25:
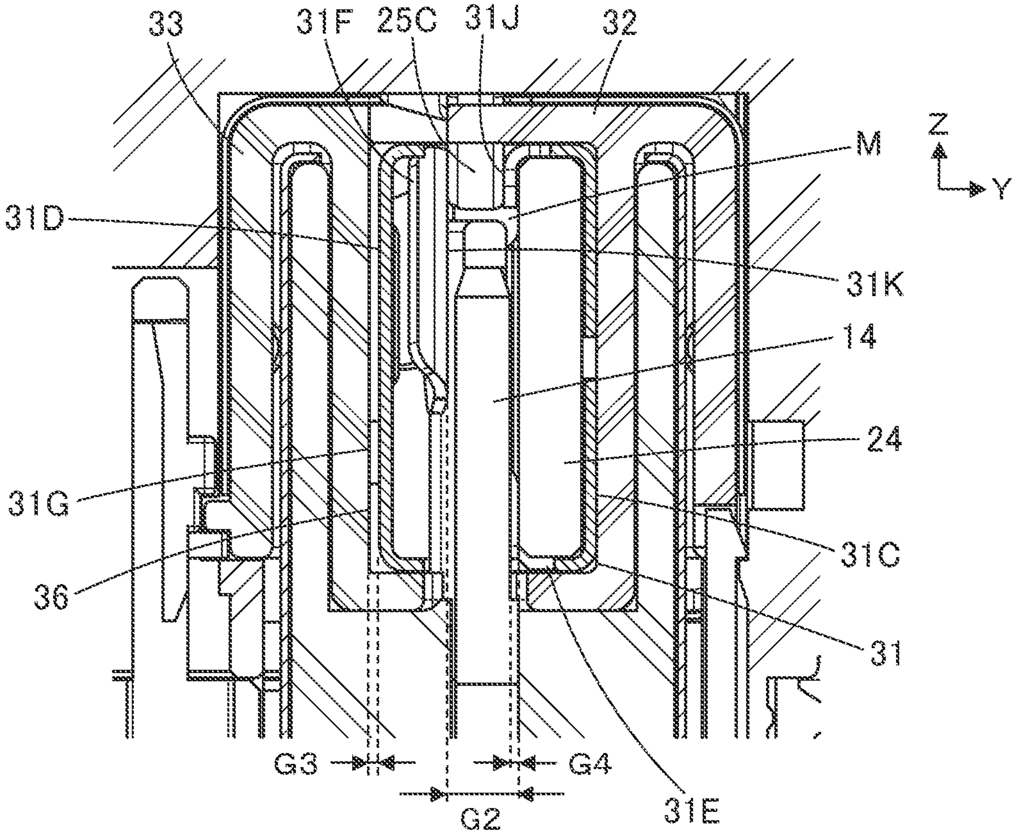
FIG. 25 is a cross-sectional front view showing an interior of the second connector after fitting, with the lever member being situated in the second rotational position in Embodiment 1.

The interior of the second connector 21 at this time is shown in FIG. 25. The frame moving spring member 31G of the frame member 31 makes contact with the inner surface of the inner insulator 33 within the frame member accommodating portion 36 formed between the inner insulators 32 and 33, and the frame member 31 attached to the second contact 24 is pressed in the +Y direction against the inner insulators 32 and 33 due to an elastic force of the frame moving spring member 31G.

Thus, the frame member 31 is moved in the +Y direction (first direction) within the frame member accommodating portion 36 until the outer surface of the lateral surface portion 31C on the +Y direction side makes contact with the inner surface, on the +Y direction side, of the frame member accommodating portion 36, so that a gap G3 is formed between the inner surface, on the −Y direction side, of the frame member accommodating portion 36 and the outer surface of the lateral surface portion 31D on the −Y direction side of the frame member 31.

In addition, due to the lever member 22 being in the second rotational position, the contact spring member 31F is elastically deformed, so that the gap G2 in the Y direction having a dimension larger than the thickness of the first contact 14 is formed between the pressing portion 31K of the contact spring member 31F and the second contact 24. At this time, the second contact 24 is in a state where it has been moved in the +Y direction along with the frame member 31. Accordingly, the first contact 14 of the first connector 11 is inserted into the first contact insertion portion M, while forming a gap G4 with the second contact 24, without contacting the second contact 24.

Figure 26:
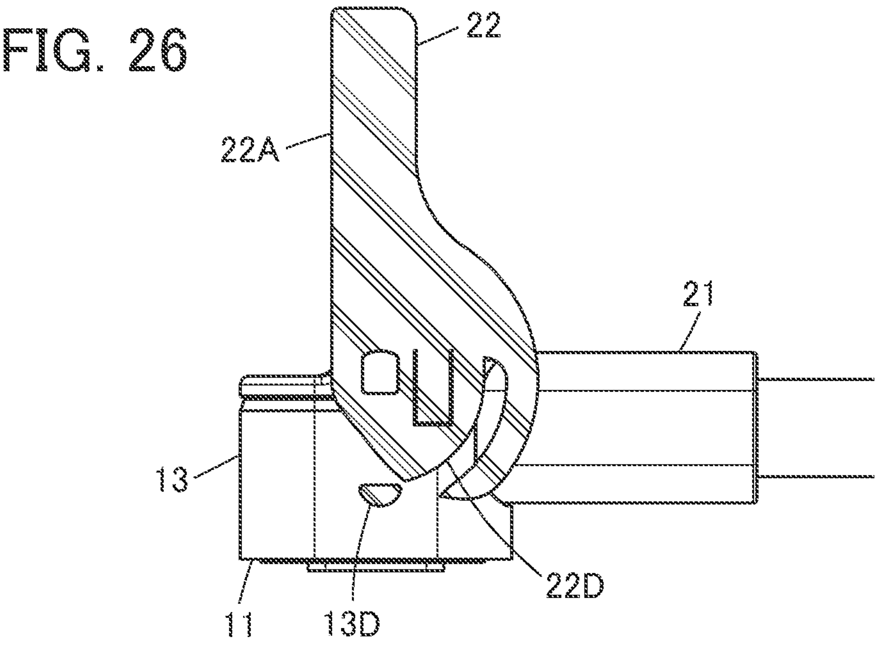
FIG. 26 is a cross-sectional side view showing the connector assembly according to Embodiment 1 after fitting, with the lever member being situated in the second rotational position.

When the lever member 22 is in the second rotational position, as shown in FIG. 26, the pin 13D of the first insulator 13 of the first connector 11 is not yet inserted to the cam groove 22D of the lever member 22 attached to the second connector 21.

Figure 27:
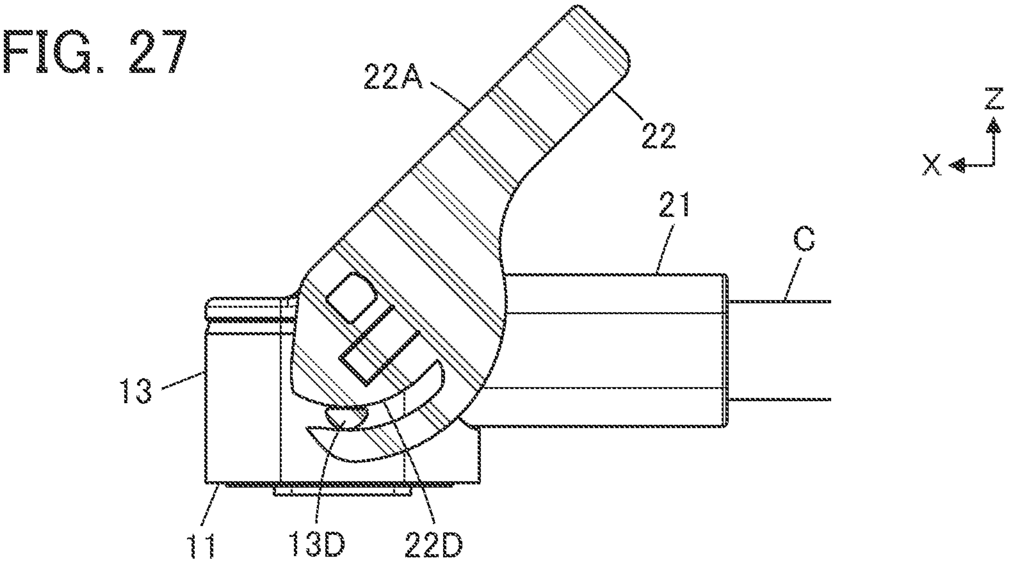
FIG. 27 is a cross-sectional side view showing the connector assembly according to Embodiment 1 after fitting, with the lever member being in the process of rotation from the second rotational position to the first rotational position.

From this state, when the lever member 22 is rotated such that the handle portion 22A is inclined toward the −X direction as shown in FIG. 27, the pin 13D of the first insulator 13 of the first connector 11 starts to be inserted into the cam groove 22D of the lever member 22.

Figure 28:
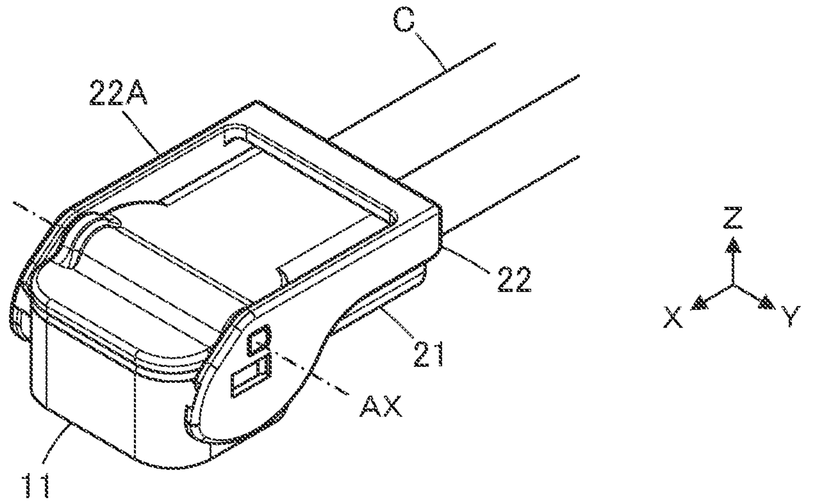
FIG. 28 is a perspective view showing the connector assembly according to Embodiment 1 after fitting, with the lever member being situated in the first rotational position.
Figure 29:
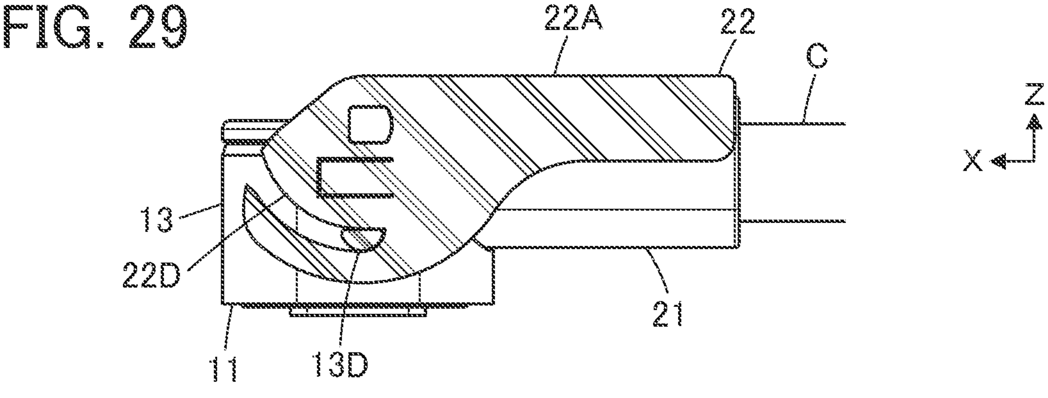
FIG. 29 is a cross-sectional side view showing the connector assembly according to Embodiment 1 after fitting, with the lever member being situated in the first rotational position.

When the lever member 22 is further rotated up to the first rotational position where the handle portion 22A extends in the X direction as shown in FIG. 28, the pin 13D of the first insulator 13 of the first connector 11 is inserted up to the deepest part of the cam groove 22D of the lever member 22 as shown in FIG. 29, and the fitting state between the first connector 11 and the second connector 21 is locked.

Figure 30:
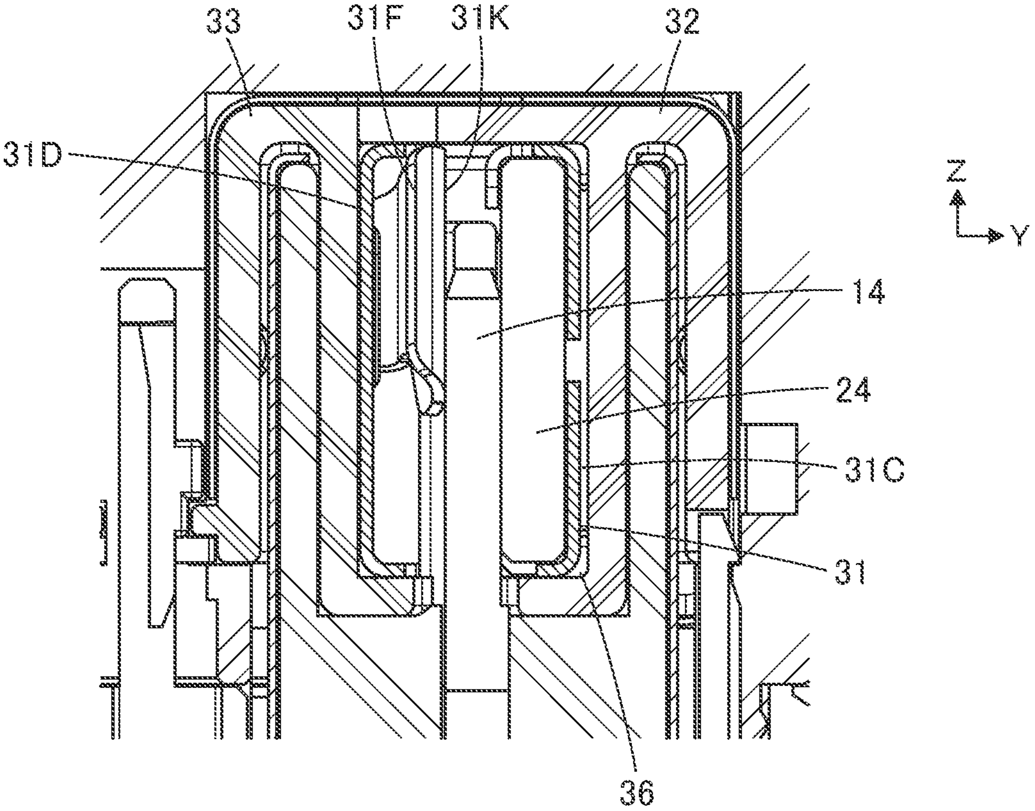
FIG. 30 is a cross-sectional front view showing an interior of the second connector after fitting, with the lever member being situated in the first rotational position in Embodiment 1.

Due to the lever member 22 being in the first rotational position, the protruding plate 25C of the rotational shaft member 25 is retracted to the +Z direction side of the frame member 31 away from the contact spring member 31F, and as shown in FIG. 30, the pressing portion 31K of the contact spring member 31F exerts a pressing force acting in the +Y direction to the first contact 14.

Consequently, the frame member 31 receives a force acting in the −Y direction as a reaction; however, since the frame moving spring member 31G in contact with the inner surface of the inner insulator 33 has an elastic force weaker than an elastic force of the contact spring member 31F, the frame moving spring member 31G elastically deforms, so that the frame member 31 is moved in the −Y direction (second direction) within the frame member accommodating portion 36 until the outer surface of the lateral surface portion 31D on the −Y direction side makes contact with the inner surface, on the −Y direction side, of the frame member accommodating portion 36.

As a result, the second contact 24 is also moved in the −Y direction along with the frame member 31, so that the first contact 14 and the second contact 24 make contact with and are electrically connected to each other at a predetermined contact pressure.

Since the first contact 14 and the second contact 24 are thus pressed against each other in the Y direction without rubbing against each other in the Z direction, it is possible to bring the first contact 14 and the second contact 24 into contact at a high contact pressure while easily fitting the first connector 11 and the second connector 21 together, thereby obtaining a reliable electrical connection.

Figure 31:
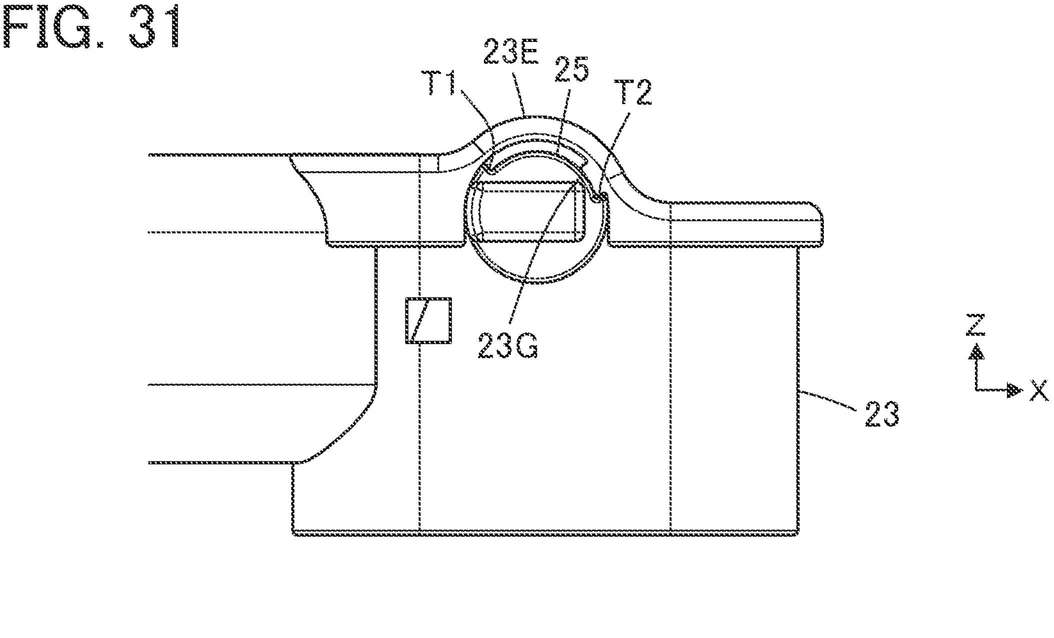
FIG. 31 is a side view showing the end of the rotational shaft member before fitting operation, with the lever member being situated in the first rotational position in Embodiment 1.

When the lever member 22 is rotated up to the first rotational position where the handle portion 22A extends in the X direction, the stopper 23G formed at the shaft end accommodating portion 23E of the second insulator 23 makes contact with the second step portion T2 of the rotational shaft member 25 as shown in FIG. 31. In other words, the first step portion T1 and the second step portion T2 of the rotational shaft member 25 and the stopper 23G constitute a rotation stopper mechanism that inhibits the lever member 22 from being rotated beyond the range between the first rotational position and the second rotational position.

To release the fitting between the first connector 11 and the second connector 21 from the state where the first connector 11 and the second connector 21 are fitted together and the first contact 14 and the second contact 24 are electrically connected together, it is sufficient that the lever member 22 is rotated from the first rotational position to the second rotational position to unlock the fitting between the first connector 11 and the second connector 21, whereafter the second connector 21 is relatively pulled up in the +Z direction with respect to the first connector 11 and thereby detached from the first connector 11.

Embodiment 2

While, in Embodiment 1 described above, the cam surface 25H used to elastically deform the contact spring member 31F of the frame member 31 in the second connector 21 is formed on the protruding plate 25C of the rotational shaft member 25, the invention is not limited thereto.

Figure 32:
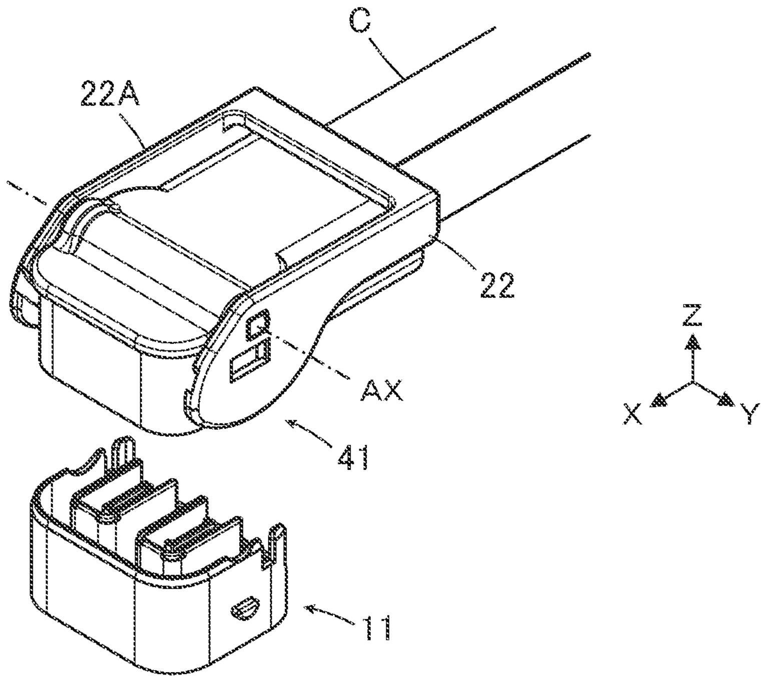
FIG. 32 is a perspective view showing a connector assembly according to Embodiment 2 before fitting operation, with the lever member being situated in the first rotational position.

FIG. 32 shows a connector assembly according to Embodiment 2 before fitting operation. This connector assembly is configured such that in the connector assembly according to Embodiment 1, a second connector 41 in place of the second connector 21 is fitted with the first connector 11, and the second connector 41 has the lever member 22 that is rotatable about the rotational axis AX as with Embodiment 1.

Figure 33:
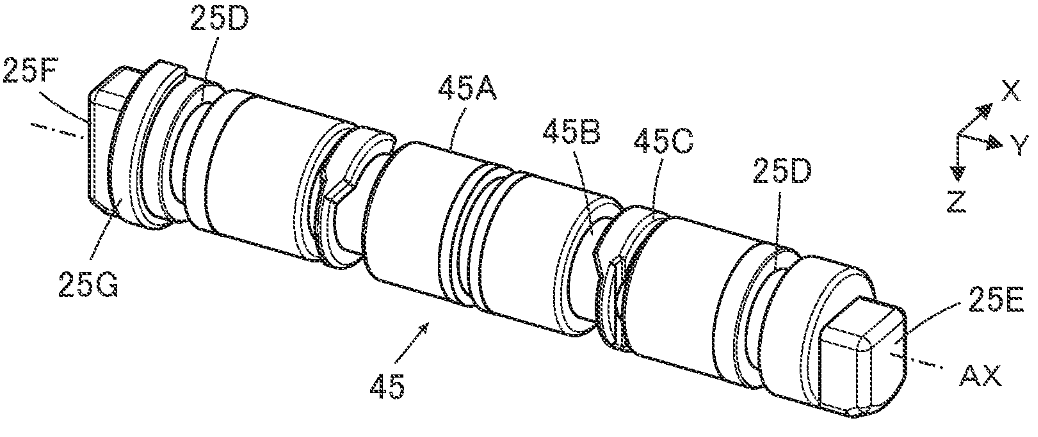
FIG. 33 is a perspective view showing a rotational shaft member used in Embodiment 2.
Figure 35:
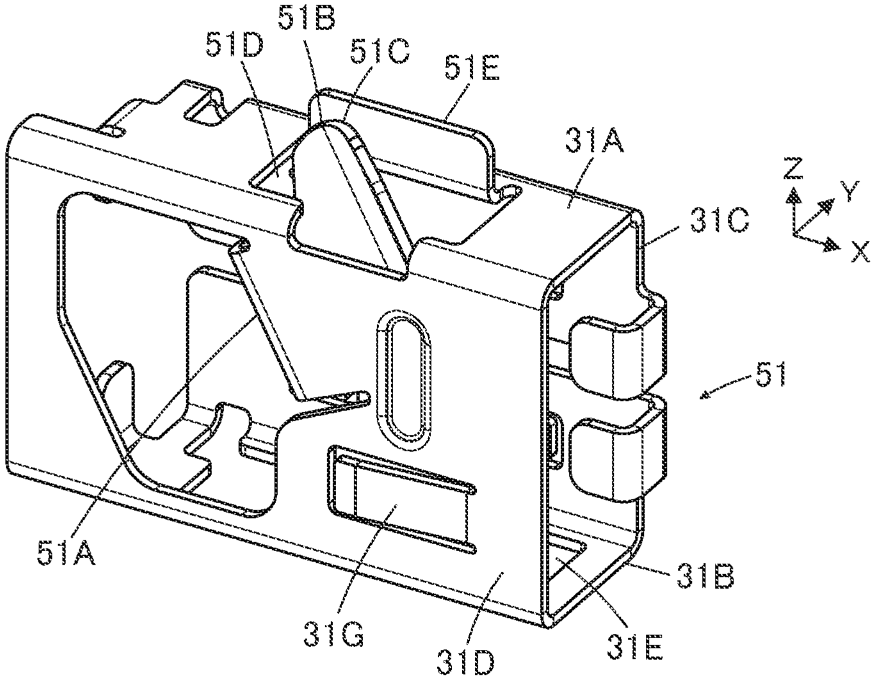
FIG. 35 is a perspective view showing a frame member used in Embodiment 2.

The second connector 41 is configured such that, in the second connector 21 used in Embodiment 1, a rotational shaft member 45 shown in FIG. 33 is used in place of the rotational shaft member 25, and a frame member 51 shown in FIG. 35 is used in place of the frame member 31; the second connector 41 otherwise has the same configuration as the second connector 21 in Embodiment 1.

The rotational shaft member 45 used in the second connector 41 includes a shaft body 45A of round columnar shape extending in the Y direction along the rotational axis AX as shown in FIG. 33. A pair of packing retaining grooves 25D are formed at the opposite ends, in the Y direction, of the shaft body 45A, and protrusions 25E and 25F are respectively formed on the +Y directional end surface and the −Y directional end surface of the shaft body 45A. Further, a large diameter portion 25G is formed between the packing retaining groove 25D at the −Y directional end of the shaft body 45A and the protrusion 25F. The packing retaining grooves 25D, the protrusion 25E, the protrusion 25F, and the large diameter portion 25G are identical to those formed in the rotational shaft member 25 in Embodiment 1.

The rotational shaft member 45 is provided with a pair of contact spring insertion grooves 45B of annular shape between the pair of packing retaining grooves 25D of the shaft body 45A, the pair of contact spring insertion grooves 45B being situated at a distance in the Y direction and extending in the circumferential direction of the shaft body 45A along an XZ plane. In addition, an abutment portion insertion groove 45C of annular shape is formed on the +Y direction side of, of the pair of contact spring insertion grooves 45B, the contact spring insertion groove 45B situated on the +Y direction side to be adjacent thereto. Likewise, an abutment portion insertion groove 45C of annular shape is formed also on the −Y direction side of the contact spring insertion groove 45B situated on the −Y direction side. These abutment portion insertion grooves 45C extend in the circumferential direction of the shaft body 45A along an XZ plane.

Figure 34:
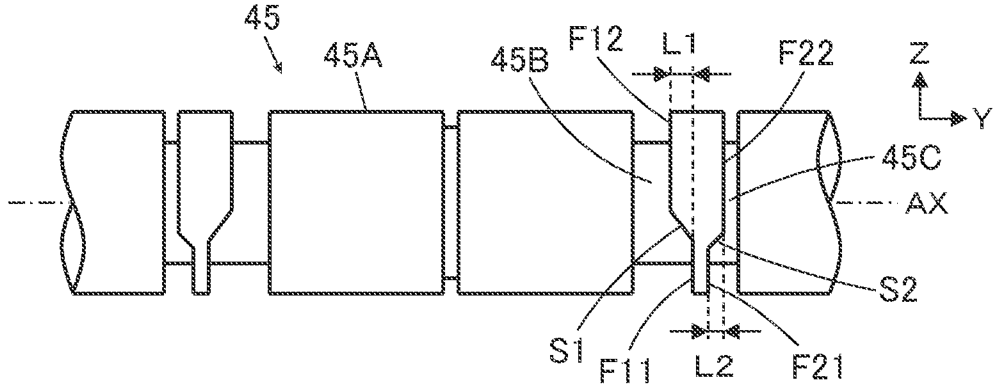
FIG. 34 is a front view showing a main portion of the rotational shaft member used in Embodiment 2.

As shown in FIG. 34, of the pair of contact spring insertion grooves 45B, the contact spring insertion groove 45B situated on the +Y direction side is provided in its interior with a step portion S1 formed on the inner lateral surface of the contact spring insertion groove 45B, and a first lateral surface portion F11 and a second lateral surface portion F12 are arranged adjacently in the circumferential direction of the rotational shaft member 45 with the step portion S1 being disposed therebetween. The first lateral surface portion F11 and the second lateral surface portion F12 each face the −Y direction along the rotational axis AX, and, due to the presence of the step portion S1, the second lateral surface portion F12 protrudes more in the −Y direction than the first lateral surface portion F11 by a distance L1 to form a cam surface of the rotational shaft member 45.

Further, of the pair of abutment portion insertion grooves 45C, the abutment portion insertion groove 45C situated on the +Y direction side is provided in its interior with a step portion S2 formed on the inner lateral surface of the abutment portion insertion groove 45C, and a first lateral surface portion F21 and a second lateral surface portion F22 are arranged adjacently in the circumferential direction of the rotational shaft member 45 with the step portion S2 being disposed therebetween. The first lateral surface portion F21 and the second lateral surface portion F22 each face the +Y direction along the rotational axis AX, and, due to the presence of the step portion S2, the second lateral surface portion F22 protrudes more in the +Y direction than the first lateral surface portion F21 by a distance L2 to form an abutment portion receiving surface of the rotational shaft member 45.

The first lateral surface portion F21 of the abutment portion insertion groove 45C is disposed back to back with the first lateral surface portion F11 of the contact spring insertion groove 45B adjacent to the abutment portion insertion groove 45C, and the second lateral surface portion F22 forming the abutment portion receiving surface of the abutment portion insertion groove 45C is disposed back to back with the second lateral surface portion F12 forming the cam surface of the contact spring insertion groove 45B adjacent to the abutment portion insertion groove 45C.

The contact spring insertion groove 45B and the abutment portion insertion groove 45C situated on the −Y direction side of the rotational shaft member 45 are arranged and configured to be symmetrical in the Y direction to the contact spring insertion groove 45B and the abutment portion insertion groove 45C situated on the +Y direction side of the rotational shaft member 45.

FIG. 35 shows the frame member 51 disposed in, of a pair of second contact structures S of the second connector 41, a second contact structure S situated on the +Y direction side. The frame member 51 includes a top surface portion 31A extending along an XY plane and situated on the +Z direction side, a bottom surface portion 31B extending along an XY plane and situated on the −Z direction side, a lateral surface portion 31C extending along an XZ plane and joining the +Y directional ends of the top surface portion 31A and the bottom surface portion 31B together, and a lateral surface portion 31D extending along an XZ plane and joining the −Y directional ends of the top surface portion 31A and the bottom surface portion 31B together, as with the frame member 31 in Embodiment 1.

The bottom surface portion 31B is provided with a first contact insertion port 31E used to insert the first contact 14 of the first connector 11, and the lateral surface portion 31D is provided with a frame moving spring member 31G made by cutting a metal plate constituting the lateral surface portion 31D into a U-shape and bending the cut portion in the −Y direction.

The frame member 51 is further provided in its interior with a contact spring member 51A made by cutting the metal plate constituting the lateral surface portion 31D into a substantially U-shape and bending the cut portion toward the interior of the frame member 51, and the contact spring member 51A is provided with a pressing portion 51B inclined with respect to the Z direction and linearly extending along an XZ plane, as with the frame member 31 in Embodiment 1. In the frame member 51, however, a +Z directional end portion 51C of the pressing portion 51B penetrates an opening 51D formed in the top surface portion 31A and projects in the +Z direction from the frame member 51.

The frame moving spring member 31G has an elastic force weaker than that of the contact spring member 51A.

The opening 51D is made by cutting a metal plate constituting the top surface portion 31A into a U-shape and bending the cut portion in the +Z direction from the top surface portion 31A, and the bent portion of the metal plate forms an abutment portion 51E that faces the pressing portion 51B of the contact spring member 51A in the Y direction, the abutment portion 51E projecting in the +Z direction from the top surface portion 31A.

Of the pair of second contact structures S, a second contact structure S disposed on the −Y direction side has a frame member configured to be symmetrical in the Y direction to the frame member 51 shown in FIG. 35.

In the second connector 41, the end portion 51C of the pressing portion 51B of the contact spring member 51A that projects in the +Z direction from the top surface portion 31A of the frame member 51 is inserted into the contact spring insertion groove 45B of the rotational shaft member 45, and the abutment portion 51E projecting in the +Z direction from the top surface portion 31A of the frame member 51 is similarly inserted into the abutment portion insertion groove 45C of the rotational shaft member 45.

Figure 36:
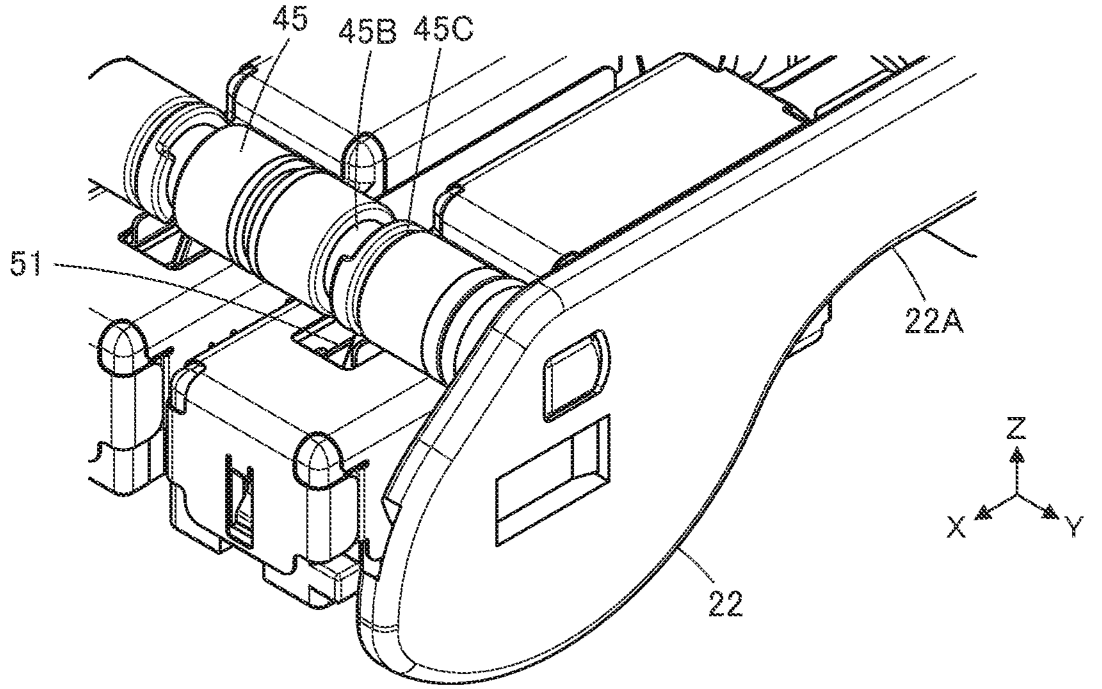
FIG. 36 is a partial perspective view showing the rotational shaft member when the lever member is situated in the first rotational position in Embodiment 2.
Figure 37:
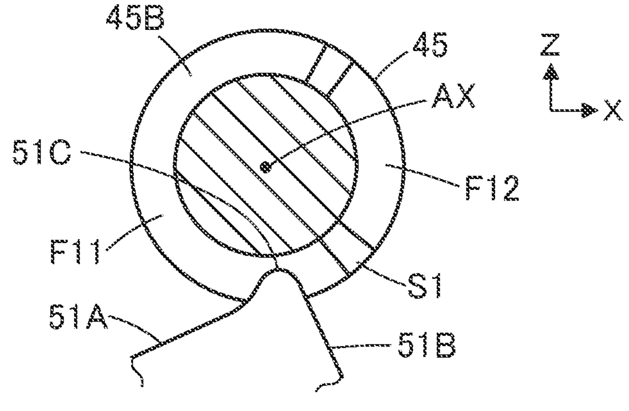
FIG. 37 is a cross-sectional view showing the rotational shaft member when the lever member is situated in the first rotational position in Embodiment 2.

When the lever member 22 is in the first rotational position as shown in FIG. 36, the first lateral surface portion F11 of the contact spring insertion groove 45B of the rotational shaft member 45 faces the end portion 51C of the pressing portion 51B of the contact spring member 51A as shown in FIG. 37.

Figure 38:
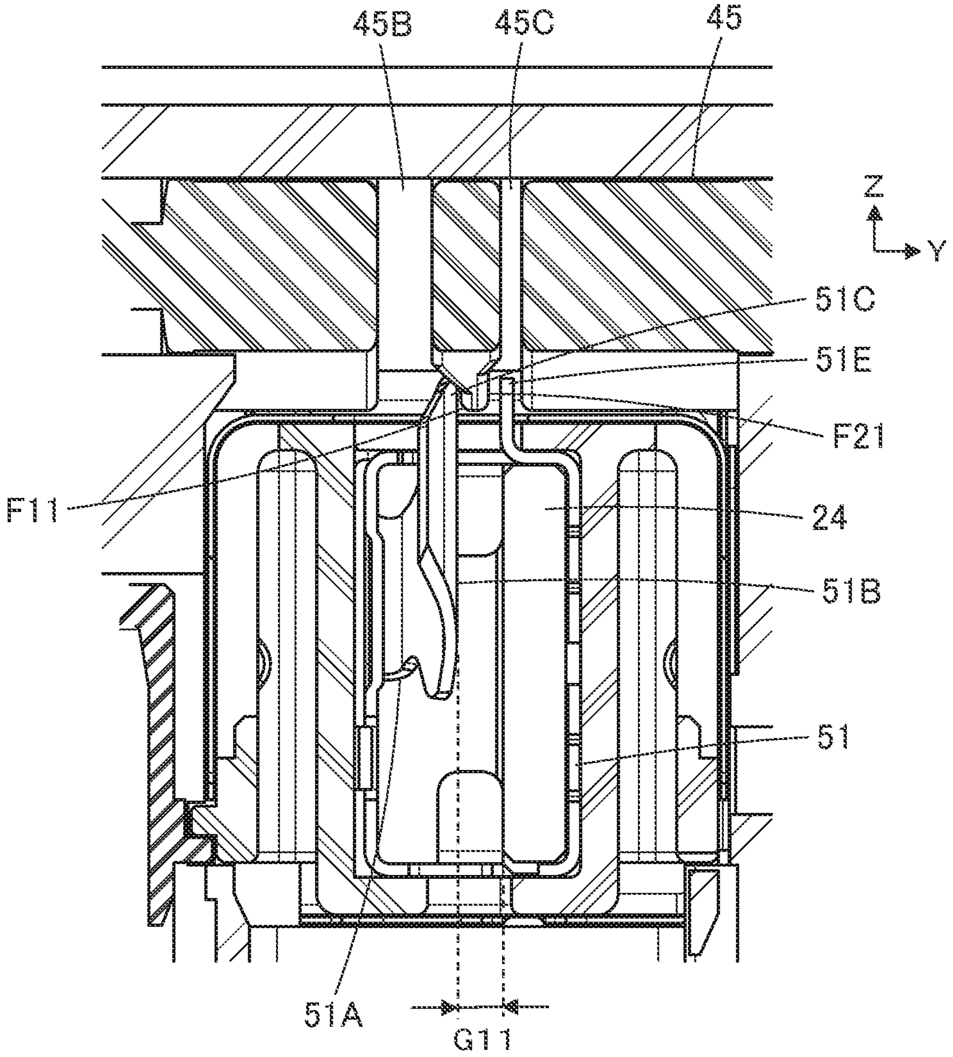
FIG. 38 is a cross-sectional front view showing an interior of a second connector before fitting operation, with the lever member being situated in the first rotational position in Embodiment 2.

Accordingly, as shown in FIG. 38, the end portion 51C of the pressing portion 51B of the contact spring member 51A is situated apart from the first lateral surface portion F11 of the contact spring insertion groove 45B in the −Y direction and is not in contact with the rotational shaft member 45. Thus, no external force is exerted on the contact spring member 51A, and a gap G11 in the Y direction between the pressing portion 51B of the contact spring member 51A and the second contact 24 has a dimension smaller than the thickness of the first contact 14 which is not shown herein.

It should be noted that, since the first lateral surface portion F21 of the abutment portion insertion groove 45C is disposed back to back with the first lateral surface portion F11 of the contact spring insertion groove 45B, the abutment portion 51E of the frame member 51 is situated apart from the first lateral surface portion F21 of the abutment portion insertion groove 45C in the +Y direction and is not in contact with the rotational shaft member 45.

Figure 39:
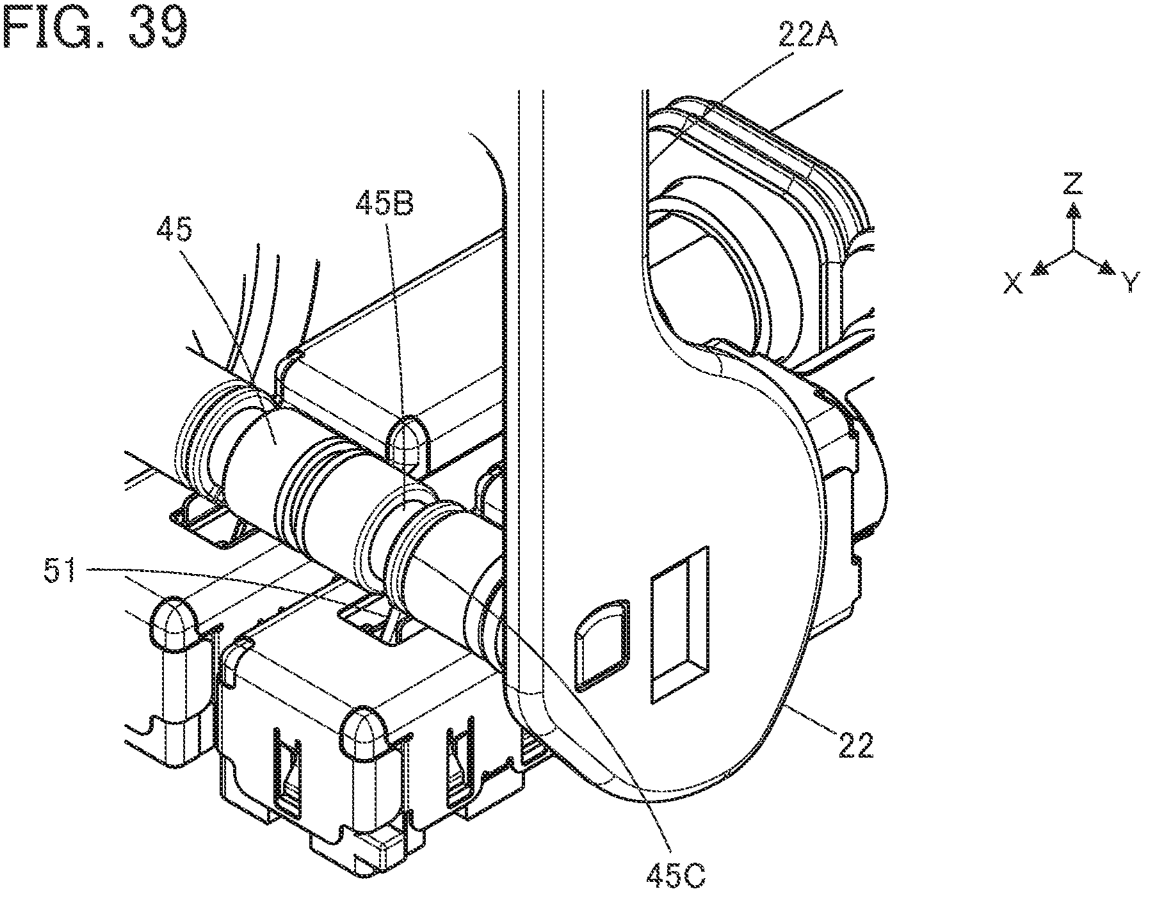
FIG. 39 is a partial perspective view showing the rotational shaft member when the lever member is situated in the second rotational position in Embodiment 2.
Figure 40:
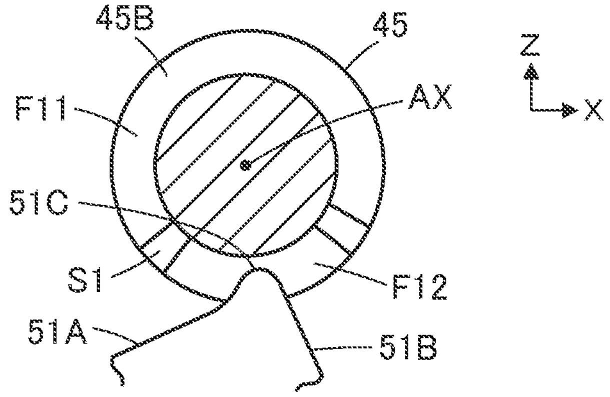
FIG. 40 is a cross-sectional view showing the rotational shaft member when the lever member is situated in the first rotational position in Embodiment 2.

From this state, when the lever member 22 is rotated to the second rotational position such that the handle portion 22A makes an angle of 90 degrees with respect to the X direction as shown in FIG. 39, the rotational shaft member 45 also rotates about the rotational axis AX along with the rotation of the lever member 22, and as shown in FIG. 40, the second lateral surface portion F12 of the contact spring insertion groove 45B of the rotational shaft member 45 faces the end portion 51C of the pressing portion 51B of the contact spring member 51A.

Since the second lateral surface portion F12 protrudes more in the −Y direction than the first lateral surface portion F11 by the distance L1, the second lateral surface portion F12 makes contact with the end portion 51C of the pressing portion 51B of the contact spring member 51A and presses the end portion 51C in the −Y direction.

Figure 41:
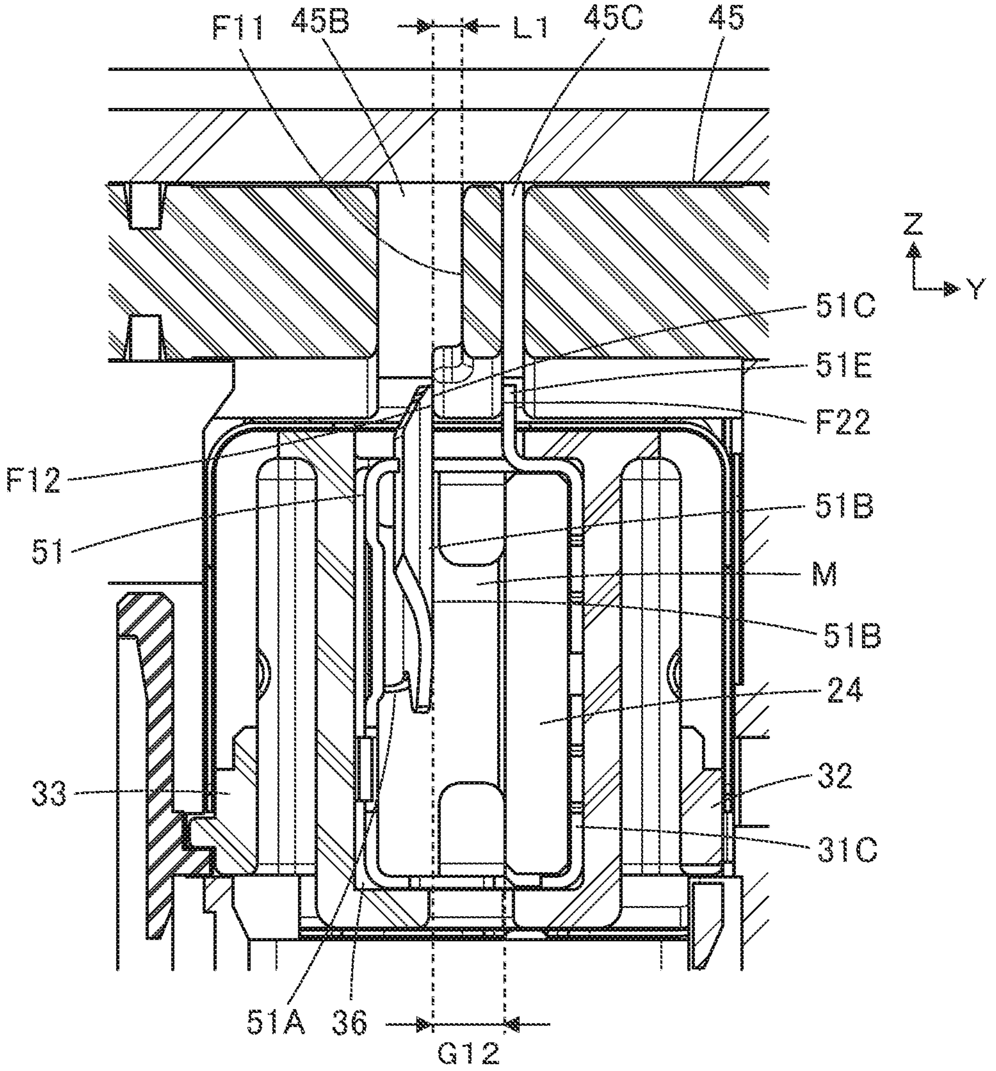
FIG. 41 is a cross-sectional front view showing an interior of the second connector before fitting operation, with the lever member being situated in the second rotational position in Embodiment 2.

Consequently, the contact spring member 51A is elastically deformed, and the pressing portion 51B of the contact spring member 51A is moved in the −Y direction away from the second contact 24 disposed along the inner surface of the lateral surface portion 31C of the frame member 51, as shown in FIG. 41. As a result, a gap G12 in the Y direction having a dimension larger than the thickness of the first contact 14 is formed between the pressing portion 51B and the second contact 24.

Thus, a first contact insertion portion M that allows the first contact 14 to be inserted along the Z direction without contacting the second contact 24 is formed between the pressing portion 51B of the contact spring member 51A and the second contact 24.

At this time, the end portion 51C of the pressing portion 51B of the contact spring member 51A is pressed in the −Y direction by the second lateral surface portion F12 of the contact spring insertion groove 45B of the rotational shaft member 45, and accordingly, a force acting in the −Y direction is exerted on the frame member 51.

However, the second lateral surface portion F22 of the abutment portion insertion groove 45C that is situated back to back with the second lateral surface portion F12 of the contact spring insertion groove 45B protrudes more in the +Y direction than the first lateral surface portion F21 in the rotational shaft member 45 and is therefore in contact with the abutment portion 51E of the frame member 51.

Thus, it is possible to elastically deform the contact spring member 51A without the frame member 51 moving in the −Y direction within the frame member accommodating portion 36 formed between the inner insulators 32 and 33.

Figure 42:
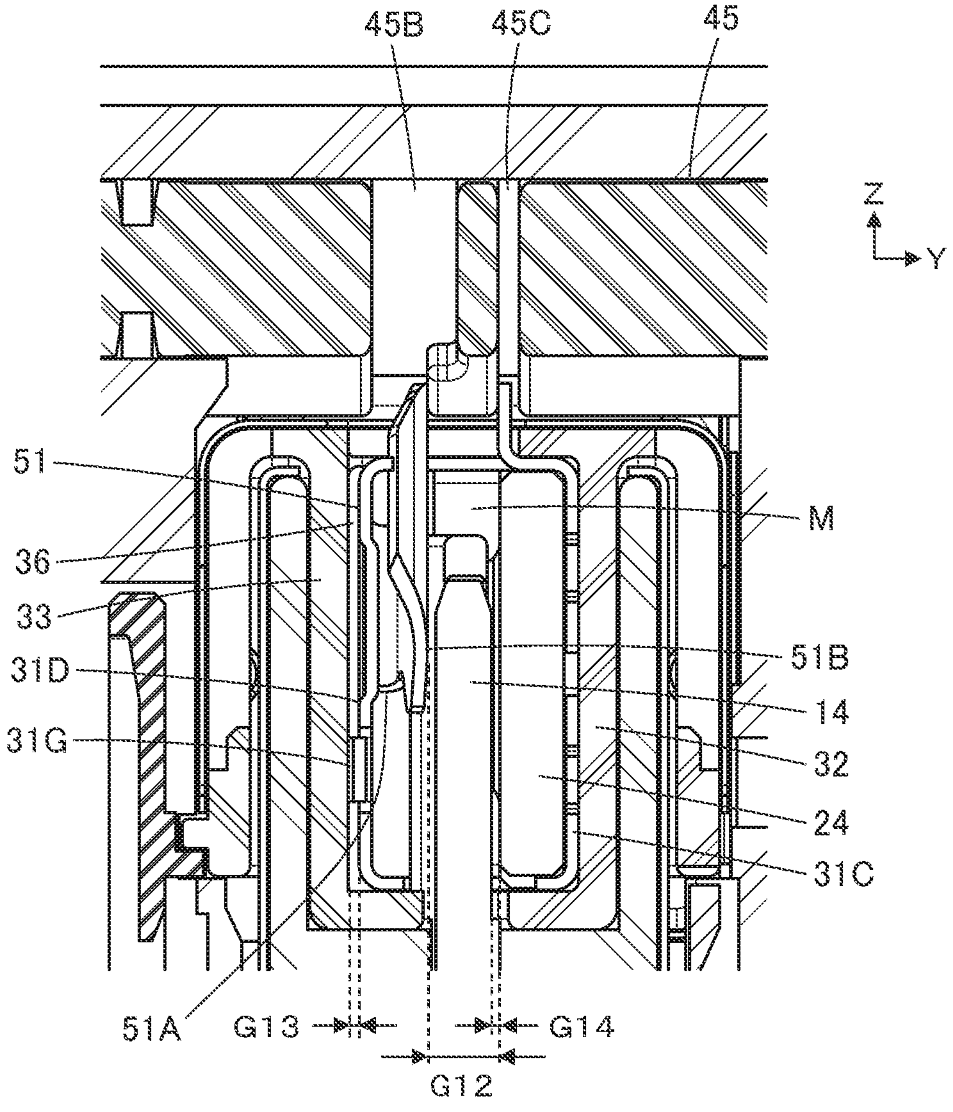
FIG. 42 is a cross-sectional front view showing an interior of the second connector after fitting, with the lever member being situated in the second rotational position in Embodiment 2.

In this state, the second connector 41 is moved toward the first connector 11 in the −Z direction, whereby the second connector 21 is fitted to the first connector 11. As shown in FIG. 42, the frame moving spring member 31G of the frame member 51 makes contact with the inner surface of the inner insulator 33 within the frame member accommodating portion 36 formed between the inner insulators 32 and 33, and the frame member 51 attached to the second contact 24 is pressed in the +Y direction against the inner insulators 32 and 33 due to an elastic force of the frame moving spring member 31G.

Thus, the frame member 51 is moved in the +Y direction (first direction) within the frame member accommodating portion 36 until the outer surface of the lateral surface portion 31C on the +Y direction side makes contact with the inner surface, on the +Y direction side, of the frame member accommodating portion 36, so that a gap G13 is formed between the inner surface, on the −Y direction side, of the frame member accommodating portion 36 and the outer surface of the lateral surface portion 31D on the −Y direction side of the frame member 51.

In addition, the contact spring member 51A is elastically deformed, so that the gap G12 in the Y direction having a dimension larger than the thickness of the first contact 14 is formed between the pressing portion 51B of the contact spring member 51A and the second contact 24, and the second contact 24 is in a state where it has been moved in the +Y direction along with the frame member 51. Accordingly, the first contact 14 of the first connector 11 is inserted into the first contact insertion portion M, while forming a gap G14 with the second contact 24, without contacting the second contact 24.

Figure 43:
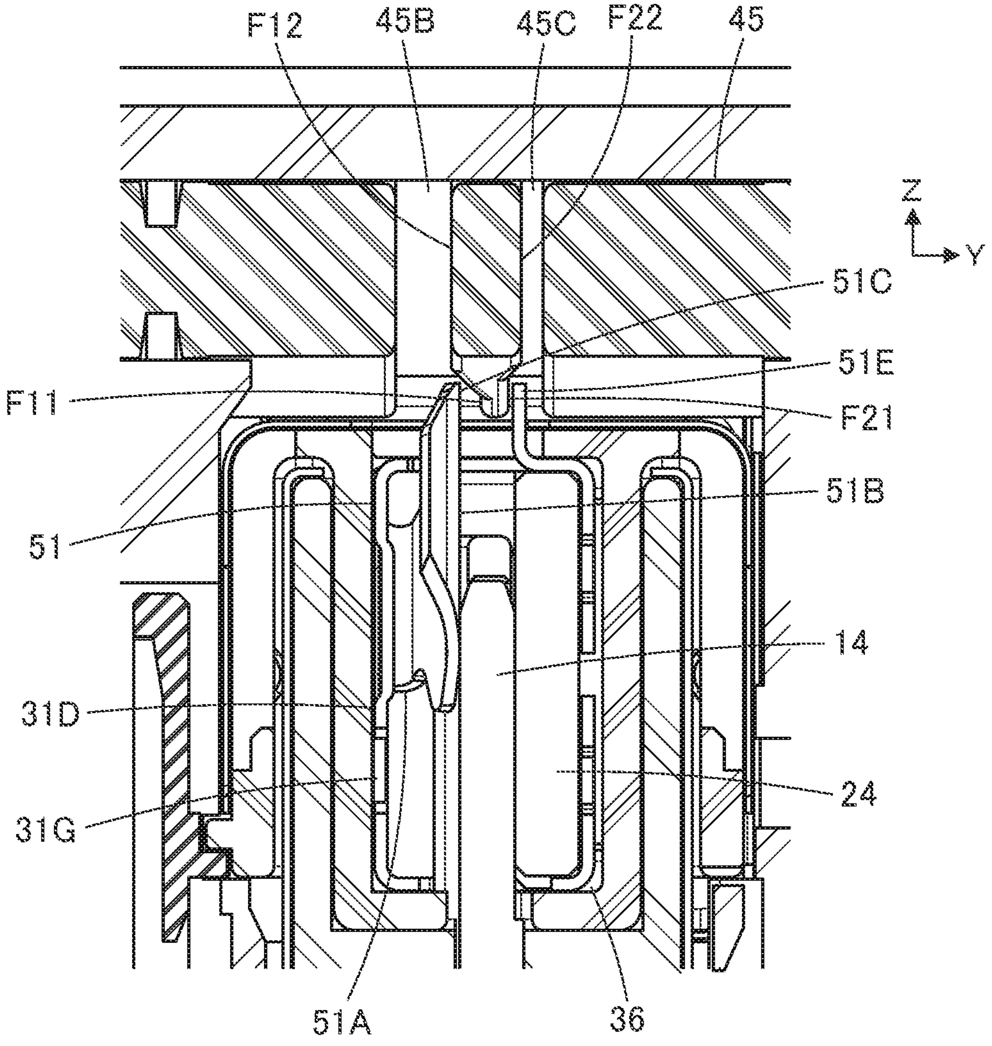
FIG. 43 is a cross-sectional front view showing an interior of the second connector after fitting, with the lever member being situated in the first rotational position in Embodiment 2.
Figure 44:
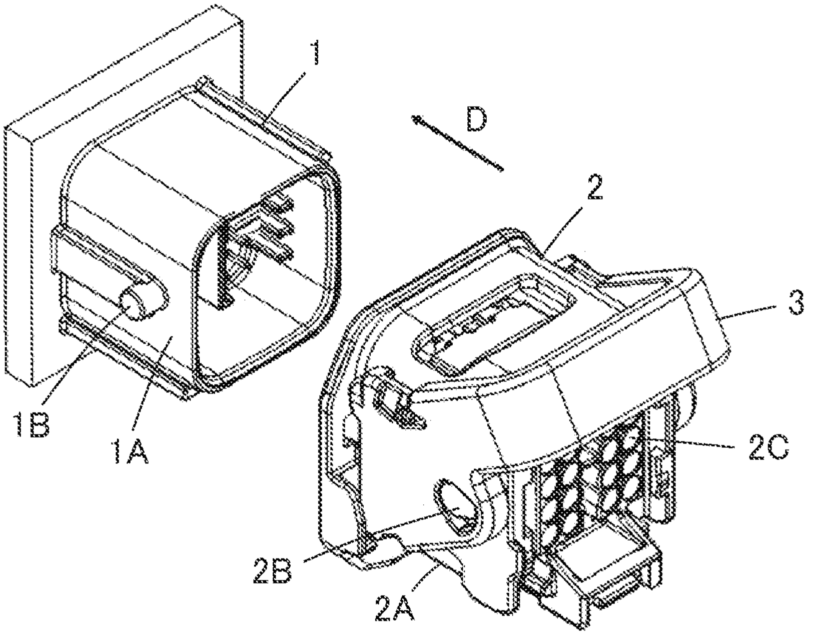
FIG. 44 PRIOR ART
FIG. 44 is a perspective view showing a conventional connector assembly before fitting operation.
Figure 45:
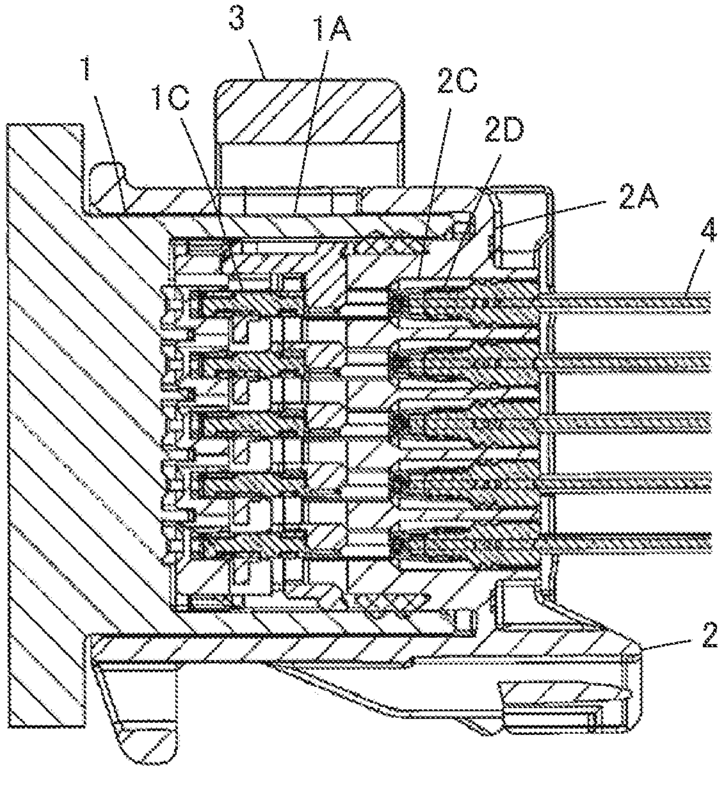
FIG. 45 PRIOR ART
FIG. 45 is a cross-sectional view showing the conventional connector assembly in a fitted state.

In this state, when the lever member 22 is further rotated to the first rotational position, the rotational shaft member 45 also rotates about the rotational axis AX along with the rotation of the lever member 22, and the end portion 51C of the pressing portion 51B of the contact spring member 51A is moved away from the second lateral surface portion F12 of the contact spring insertion groove 45B of the rotational shaft member 45 to face the first lateral surface portion F11 as shown in FIG. 37. Consequently, the end portion 51C of the pressing portion 51B of the contact spring member 51A makes no contact with the rotational shaft member 45 as shown in FIG. 43, and a pressing force acting in the +Y direction is exerted on the first contact 14 by the pressing portion 51B of the contact spring member 51A.

As a result, the frame member 51 receives a force acting in the −Y direction as a reaction.

In this process, the abutment portion 51E of the frame member 51 is also moved away from the second lateral surface portion F22 of the abutment portion insertion groove 45C to face the first lateral surface portion F21 and situated away from the first lateral surface portion F21 in the +Y direction.

Since the frame moving spring member 31G in contact with the inner surface of the inner insulator 33 has an elastic force weaker than an elastic force of the contact spring member 51A, the frame moving spring member 31G elastically deforms, so that the frame member 51 is moved in the −Y direction (second direction) within the frame member accommodating portion 36 until the outer surface, on the −Y direction side, of the lateral surface portion 31D makes contact with the inner surface, on the −Y direction side, of the frame member accommodating portion 36.

As a result, the second contact 24 is also moved in the −Y direction along with the frame member 51, so that the first contact 14 and the second contact 24 make contact with and are electrically connected to each other at a predetermined contact pressure.

Also in Embodiment 2, since the first contact 14 and the second contact 24 are thus pressed against each other in the Y direction without rubbing against each other in the Z direction, it is possible to bring the first contact 14 and the second contact 24 into contact at a high contact pressure while easily fitting the first connector 11 and the second connector 41 together, thereby obtaining a reliable electrical connection.

To release the fitting between the first connector 11 and the second connector 41 from the state where the first connector 11 and the second connector 41 are fitted together and the first contact 14 and the second contact 24 are electrically connected together, it is sufficient that the lever member 22 is rotated from the first rotational position to the second rotational position to unlock the fitting between the first connector 11 and the second connector 41, whereafter the second connector 41 is relatively pulled up in the +Z direction with respect to the first connector 11 and thereby detached from the connector 11, as with Embodiment 1.

While, in Embodiments 1 to 2 above, the first rotational position and the second rotational position of the lever member 22 are defined to correspond to rotational angles of the lever member 22 of 0 degrees and 90 degrees, respectively, the invention is not limited thereto, and the rotational positions may be defined to correspond to other rotational angles.

What is claimed is:

1. A connector assembly comprising:

a first connector including a first insulator and a first contact held by the first insulator;

a second connector including a second insulator and a second contact held by the second insulator, the second connector being fitted to the first connector along a fitting direction;

a contact spring member attached to the second contact and including a pressing portion configured to press the first contact against the second contact to bring the first contact and the second contact into contact with each other;

a lever member held by the second insulator and being rotatable about a rotational axis between a first rotational position and a second rotational position;

a rotational shaft member held by the second insulator to rotate about the rotational axis along with rotation of the lever member and including a cam surface configured to elastically deform the contact spring member; and a fitting cam mechanism relatively moving the first insulator and the second insulator along the fitting direction in conjunction with rotation of the lever member, wherein when the lever member is placed in the second rotational position, the cam surface of the rotational shaft member makes contact with and elastically deforms the contact spring member, whereby a first contact insertion portion that allows the first contact to be inserted thereinto along the fitting direction is formed between the pressing portion and the second contact, and in a state where the first connector and the second connector are fitted together and the first contact is inserted in the first contact insertion portion, when the lever member is rotated from the second rotational position to the first rotational position, fitting between the first connector and the second connector is locked by the fitting cam mechanism, and the cam surface of the rotational shaft member is moved away from the contact spring member, so that the first contact and the second contact are pressed against each other by the pressing portion to make contact with each other.

2. The connector assembly according to claim 1, comprising:

a frame member attached to the second contact; and an inner insulator fixed inside the second insulator and provided with a frame member accommodating portion that accommodates the frame member such that the frame member is movable in a direction along the rotational axis, wherein the frame member is provided with the contact spring member and a frame moving spring member that elastically makes contact with the inner insulator, and when the cam surface makes contact with and elastically deforms the contact spring member, the frame member is moved in a first direction along the rotational axis with respect to the inner insulator due to an elastic force of the frame moving spring member, and a gap is formed between the first contact inserted in the first contact insertion portion and the second contact.

3. The connector assembly according to claim 2, wherein the frame moving spring member has an elastic force weaker than that of the contact spring member, and when the first contact is inserted in the first contact insertion portion and the cam surface is moved away from the contact spring member, the frame moving spring member elastically deforms upon receipt of an elastic force of the contact spring member, whereby the frame member is moved in a second direction opposite from the first direction with respect to the inner insulator, so that the first contact and the second contact make contact with each other.

4. The connector assembly according to claim 3, wherein the contact spring member and the frame moving spring member are each formed from a plate spring made by bending a part of the frame member.

5. The connector assembly according to claim 2, wherein the rotational shaft member includes a protruding plate extending in a radial direction with respect to the rotational axis, and the cam surface is formed on the protruding plate.

6. The connector assembly according to claim 5, wherein the frame member includes a protruding plate receiving portion that faces the pressing portion of the contact spring member, and the cam surface makes contact with an end portion of the pressing portion of the contact spring member to elastically deform the contact spring member in a state where the protruding plate is inserted between the pressing portion of the contact spring member and the protruding plate receiving portion.

7. The connector assembly according to claim 2, wherein the rotational shaft member includes a contact spring insertion groove which extends in a circumferential direction along a plane perpendicular to the rotational axis and into which an end portion of the pressing portion of the contact spring member is inserted, and the cam surface is formed from a lateral surface of the contact spring insertion groove.

8. The connector assembly according to claim 7, wherein the frame member includes an abutment portion that faces the pressing portion of the contact spring member, the rotational shaft member includes an abutment portion receiving surface that extends along a plane perpendicular to the rotational axis and that faces in a direction along the rotational axis, and the cam surface makes contact with the end portion of the pressing portion of the contact spring member to elastically deform the contact spring member in a state where the abutment portion is in contact with the abutment portion receiving surface upon rotation of the rotational shaft member.

9. The connector assembly according to claim 8, wherein the rotational shaft member includes an abutment portion insertion groove into which the abutment portion is inserted, and the abutment portion receiving surface is formed from a lateral surface of the abutment portion insertion groove.

10. The connector assembly according to claim 1, wherein the cam surface is inclined in a direction along the rotational axis, the pressing portion of the contact spring member extends in a direction inclined with respect to the fitting direction, and the cam surface makes contact with a widthwise end portion of the pressing portion to elastically deform the contact spring member along with rotation of the rotational shaft member.

11. The connector assembly according to claim 10, wherein the contact spring member has an elastic force that gradually increases from an opening end of the first contact insertion portion into which the first contact is inserted, toward an inner part of the first contact insertion portion along the fitting direction, and the cam surface makes contact with the end portion of the pressing portion, the end portion being situated on the inner part side of the first contact insertion portion.

12. The connector assembly according to claim 5, wherein an electric wire is connected to the second contact from a connection direction perpendicular to the fitting direction and the rotational axis, the protruding plate has an outer peripheral surface of cylindrical shape taking the rotational axis as its center, and the inner insulator includes a restriction surface that faces the outer peripheral surface of the protruding plate from a direction opposite from the electric wire along the connection direction.

13. The connector assembly according to claim 1, wherein the rotational shaft member includes a pair of round columnar portions disposed at opposite ends of the rotational shaft member along the rotational axis and having a same diameter, and the second insulator includes a pair of through-holes holding the pair of round columnar portions in a rotatable manner.

14. The connector assembly according to claim 13, wherein the rotational shaft member includes a large diameter portion disposed adjacent to one of the pair of round columnar portions and having a diameter larger than that of one of the pair of round columnar portions, and the second insulator includes a shaft end accommodating portion disposed at only one end portion of the second insulator along the rotational axis and accommodating the large diameter portion.

15. The connector assembly according to claim 1, comprising a rotation stopper mechanism that inhibits the lever member from being rotated beyond a range between the first rotational position and the second rotational position.

16. The connector assembly according to claim 15, wherein the rotation stopper mechanism includes: a first step portion and a second step portion that are formed in the rotational shaft member to correspond to the first rotational position and the second rotational position, respectively, and that each have a step in a radial direction; and a stopper that is formed in the second insulator and that selectively makes contact with the first step portion and the second step portion in accordance with rotation of the rotational shaft member.

17. The connector assembly according to claim 1, wherein the lever member includes a handle portion, and a length from the rotational axis to the handle portion is larger than a length from the rotational axis to the cam surface of the rotational shaft member.

18. The connector assembly according to claim 17, wherein the fitting cam mechanism includes a cam groove formed in the lever member and a pin that is formed to protrude on the first insulator and that is inserted into the cam groove.

* * * * *